(12) United States Patent
Derzhavetz et al.

(10) Patent No.: US 12,117,938 B1
(45) Date of Patent: Oct. 15, 2024

(54) BYPASS DESTAGING OF DECREMENT REFERENCE COUNT OPERATIONS WITH DELTA LOG BASED ARCHITECTURE

(71) Applicant: Dell Products L.P., Hopkinton, MA (US)

(72) Inventors: Jenny Derzhavetz, Raanana (IL); Vladimir Shveidel, Pardes-Hana (IL); Michael Litvak, Shoham (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/210,355

(22) Filed: Jun. 15, 2023

(51) Int. Cl.
*G06F 12/0882* (2016.01)

(52) U.S. Cl.
CPC .. *G06F 12/0882* (2013.01); *G06F 2212/1021* (2013.01)

(58) Field of Classification Search
None
See application file for complete search history.

(56) References Cited

U.S. PATENT DOCUMENTS

2018/0307425 A1* 10/2018 Blount ................ G06F 3/0631
2021/0286537 A1* 9/2021 Shveidel ............. G06F 3/061

OTHER PUBLICATIONS

U.S. Appl. No. 16/742,076, filed Jan. 14, 2020, entitled Efficient Handling of Highly Amortized Metadata Page Updates in Storage Clusters With Delta Log-Based Architectures, to Vladimir Shveidel, et al.
U.S. Appl. No. 16/662,569, filed Oct. 24, 2019, entitled System and Method for Idempotent Metadata Destage in a Storage Cluster With Delta Log Based Architecture, to Vladimir Shveidel, et al.
U.S. Appl. No. 16/260,660, filed Jan. 29, 2019, entitled System and Method for Aggregating Metadata Changes in a Storage System, to Vladimir Shveidel, et al.
U.S. Appl. No. 17/237,398, filed Apr. 22, 2021, entitled System and Method for Lockless Reading of Metadata Pages, to Jenny Derzhavetz, et al.
U.S. Appl. No. 17/237,359, filed Apr. 22, 2021, entitled System and Method for Lockless Destaging of Metadata Pages, to Jenny Derzhavetz, et al.

* cited by examiner

*Primary Examiner* — Khoa D Doan
*Assistant Examiner* — Edmund H Kwong
(74) *Attorney, Agent, or Firm* — Muirhead and Saturnelli, LLC

(57) ABSTRACT

In at least one embodiment, processing can include: determining that an inactive decref (decrement reference count) MDL (metadata log) of decref MD (metadata) updates stored in memory is unable to be destaged to a decref tier of non-volatile storage in a first destage phase of a two phase destage process; and responsive to determining that the inactive decref MDL is unable to be destaged to the decref tier, performing bypass destage processing of the inactive decref MDL, wherein said bypass destage processing includes directly applying MD updates of the inactive decref MDL to corresponding MD pages stored persistently in a MD page store and wherein said bypass destage processing omits storing the inactive decref MDL on the decref tier.

19 Claims, 11 Drawing Sheets

BYPASS DESTAGING OF DECREMENT REFERENCE COUNT OPERATIONS WITH DELTA LOG BASED ARCHITECTURE

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: determining that an inactive decref (decrement reference count) MDL (metadata log) of decref MD (metadata) updates stored in memory is unable to be destaged to a decref tier of non-volatile storage in a first destage phase of a two phase destage process; and responsive to determining that the inactive decref MDL is unable to be destaged to the decref tier, performing bypass destage processing of the inactive decref MDL, wherein said bypass destage processing includes directly applying MD updates of the inactive decref MDL to corresponding MD pages stored persistently in a MD page store and wherein said bypass destage processing omits storing the inactive decref MDL on the decref tier.

In at least one embodiment, bypass destage processing can include: creating an updated version of a first MD page, wherein said creating includes applying first decref MD updates to the first MD page, wherein said first decref MD updates are updates to the first MD page and are included in the inactive decref MDL being destaged by the bypass destage processing; persistently storing the updated first MD page in a MD page store; and subsequent to creating the updated version of the first MD page, inserting a first drop delta indicator in an active decref MDL of decref MD updates stored in memory, wherein the first drop delta indicator is inserted in a bucket B1 of the active decref MDL, wherein the bucket B1 uniquely corresponds to the first MD page, wherein the first drop delta indicator includes a first tablet ID (identifier) uniquely identifying the inactive decref MDL being destaged by the bypass destage processing.

In at least one embodiment, creating the updated version of the first MD page can include: applying second decref MD updates to the first MD page, wherein the second decref MD updates are included in the active decref MDL and are ingested prior to the first drop delta indicator; applying first common MD updates to the first MD page, wherein the first common MD updates are non-decref MD updates to the first MD page which are included in an active common MDL of non-decref MD updates stored in memory; applying second common MD updates to the first MD page, wherein the second common MD updates are non-decref MD updates to the first MD page which are included in an inactive common MDL of non-decref MD updates stored in memory; and applying third common MD updates to the first MD page, wherein the third common MD updates are non-decref MD updates to the first MD pages which are stored in a common MDL tier of non-volatile storage.

In at least one embodiment, processing can include destaging the inactive common MDL using the two phase destage process including: storing the inactive common MDL as a corresponding tablet on the common MDL tier of non-volatile storage; aggregating MD updates from the corresponding tablet and one or more other tablets; and applying the aggregated MD updates to one or more MD pages of the MD page store.

In at least one embodiment, creating the updated version of the first MD page can include applying all MD updates to the first MD page except MD updates stored on the decref tier. Processing can include creating a revised version of the first MD page including: reading a current version of the first MD page from the MD page store; and applying MD updates to the first MD page including omitting application of decref MD updates to the first MD page which are ingested prior to the first drop delta indicator.

In at least one embodiment, bypass destage processing of the inactive decref MDL can be aborted at a first point in time, and at a subsequent second point in time, recovery processing can performed that includes resuming bypass destage processing of the inactive decref MDL. Recovery processing can include: creating a second updated version of the first MD page without applying any decref MD updates to the first MD page; determining whether the active decref MDL includes the first drop delta indicator with the first tablet ID uniquely identifying the inactive decref MDL being destaged by the bypass destage processing; and responsive to determining the active decref MDL does include the first drop delta indicator with the first tablet ID uniquely identifying the inactive decref MDL being destaged by the bypass destage processing, omitting application of all decref MD updates to the second updated version of the first MD page. Recovery processing can include: responsive to determining the active decref MDL does not include the first drop delta indicator with the first tablet ID uniquely identifying the inactive decref MDL being destaged by the bypass destage processing, performing first processing. The first processing can include: applying second decref MD updates to the second updated version of the first MD page, wherein said second decref MD updates are updates to the first MD page and are included in the inactive decref MDL being destaged by the bypass destage processing; applying third decref MD updates to the second updated version of the first MD page, wherein said third decref MD updates are updates to the first MD page and are included in the active decref MDL; after application of the second decref MD updates and the third decref MD updates to the second updated version of the first MD page, persistently storing the second updated version of the first MD page in the MD page store; and inserting the first drop delta indicator in the active decref MDL of decref MD updates stored in memory, wherein the first drop delta indicator is inserted in the bucket B1 of the active decref MDL, wherein the bucket B1 uniquely corresponds to the first MD page, wherein the first drop delta indicator includes the first tablet ID (identifier) uniquely identifying the inactive decref MDL being destaged by the bypass destage processing.

In at least one embodiment, processing can include: freezing the active decref MDL thereby converting the active decref MDL to a second inactive decref MDL; and destaging the second inactive decref MDL using the two phase destage process. Destaging the second inactive decref MDL can include: storing, in the decref tier, a second tablet corresponding to the second inactive decref MDL; and creating a revised version of the first MD page, wherein said creating includes omitting application of decref MD updates to the first MD page which are ingested prior to the first drop delta indicator. The omitted decref MD updates, which are not applied to the first MD page in creating the revised version of the first MD page, can include one or more decref MD updates which are included in the bucket B1 of the second tablet and which are ingested prior to the first drop delta indicator. The omitted decref MD updates, which are not applied to the first MD page in creating the revised version of the first MD page, can include all decref MD updates of the bucket B1 of the inactive decref MDL identified by the first tablet ID of the first drop delta indicator.

In at least one embodiment, each decref MD update of the inactive decref MDL can decrement by one (1) a reference counter of an entry of a MD page. The reference count can be associated with first content stored on non-volatile storage and wherein the reference count can denote a number of times the first content is referenced by one or more storage objects thereby indicating that the first content is included as stored content of the one or more storage objects. Processing can include receiving and servicing a write operation that writes second content to a first logical address LA1, wherein prior to the write operation, first content can be stored at LA1, and after servicing the write operation, the second content can be stored at LA1 whereby the write operation overwrites the first content of LA1 with the second content. The inactive decref MDL can include a first decref MD update that decrements by one (1) a first reference count of a first entry of a first MD page. The first reference count can denote a number of times the first content is referenced by one or more logical addresses of one or more corresponding storage objects thereby indicating that the first content is stored at the one or more logical addresses of the one or more corresponding storage objects, and wherein the first decref MD update of the inactive decref MDL can be recorded in connection with servicing the write operation.

In at least one embodiment, determining that the inactive decref MDL stored in memory is unable to be destaged to the decref tier can include determining that that the decref tier of non-volatile storage has an insufficient amount of storage capacity for storing the inactive decref MDL. Determining that the inactive decref MDL stored in memory is unable to be destaged to the decref tier can include determining that that the decref tier of non-volatile storage is inaccessible and/or in a state of failure.

BRIEF DESCRIPTION OF THE DRAWINGS

Features and advantages of the present disclosure will become more apparent from the following detailed description of exemplary embodiments thereof taken in conjunction with the accompanying drawings in which.

Figure 1:
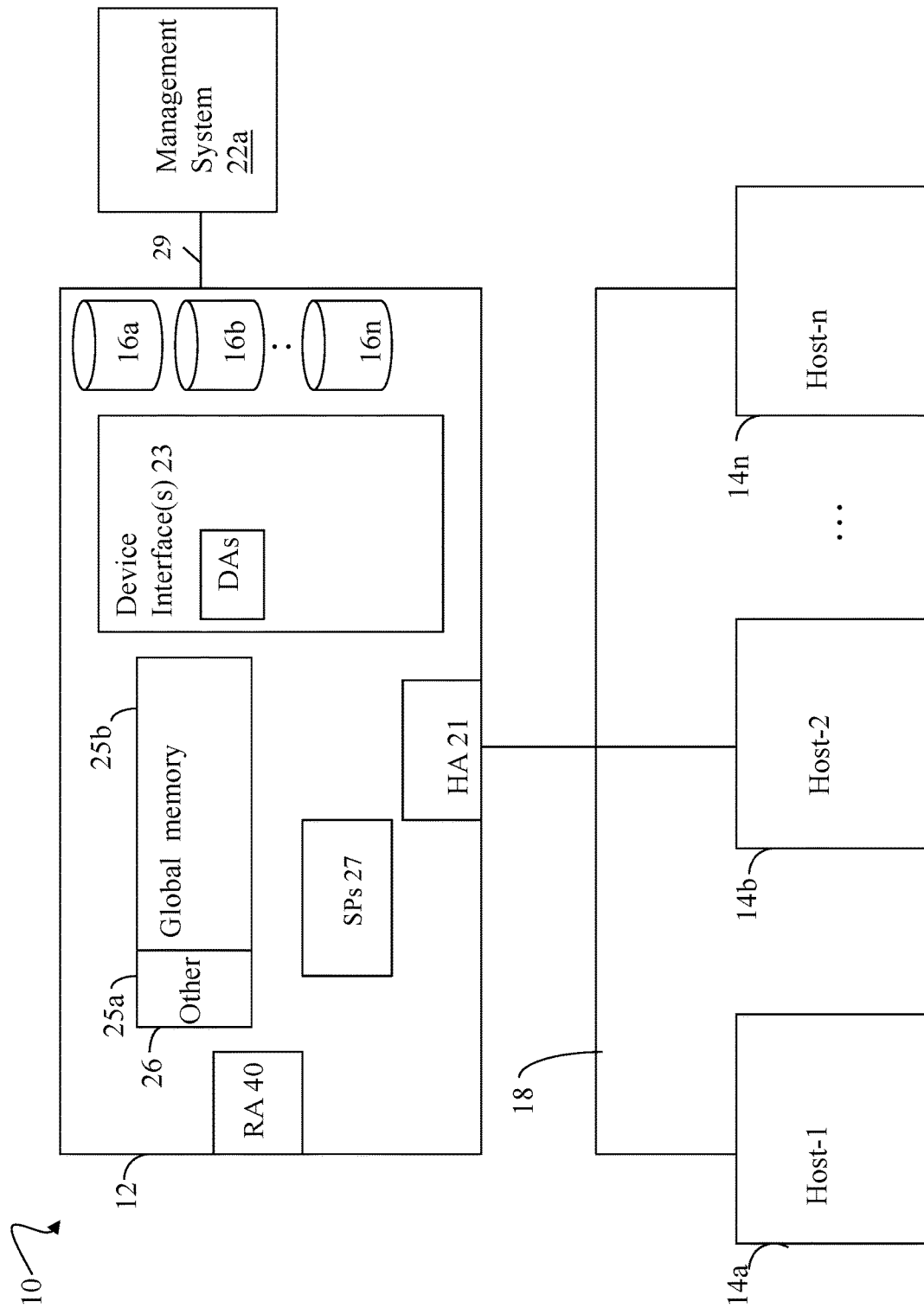
FIG. 1 is an example of components that may be included in a system in accordance with the techniques of the present disclosure.

DETAILED DESCRIPTION OF
EMBODIMENT(S)

In a data storage system, I/O operations such as read and write operations, can be received and serviced. Each I/O operation can be directed to a target logical address. For example, the I/O operations can be block-based I/O operations, where each such I/O operation is directed to a target logical address expressed as a logical device or volume in combination with an offset or logical block address (LBA). The data storage system can use mapping information to map the target logical address to a corresponding physical storage location including the content stored at the logical address. The mapping information can include a chain of metadata (MD) pages. The data storage system can be a log-based or log-structured system (LSS) which records write I/Os writing user or client content in a user data (UD) log. Recorded client writes can be subsequently flushed from the UD log and written to back-end (BE) non-volatile storage. When flushing the recorded write from the UD log, MD pages of the chain of mapping information can be allocated and/or updated as needed to map the target logical address of the recorded write to a corresponding physical storage location including content written by the recorded write.

The data storage system can also use a MD log to record updates to the MD pages. The MD page updates recorded in the MD log can include MD page updates made to MD pages of the mapping information in connection with flushing a recorded write I/O operation of the UD log. The MD log can be used in a manner similar to the UD log but with a difference that the MD log records updates to MD pages. Such MD pages can be included in the mapping information used to map logical addresses (of UD) to corresponding physical storage locations of content stored at the logical addresses. The MD log can include an in-memory or volatile MD log as well as a persistent MD log stored in non-volatile memory. The volatile or in-memory MD log can have a form and structure which facilitates efficient access, insertion, and the like. In comparison, the persistent MD log can have a different form organized in a different manner than the volatile MD log since the persistent MD log can be used primarily for recovery from an event, such as a reboot, resulting in loss of contents of the in-memory MD log. In at least one system, MD updates can be recorded in the in-memory MD log and the persistent MD log as deltas such that only the updates are recorded rather than storing, for example, complete modified or updated MD pages.

MD pages can be stored in a MD page store on BE non-volatile storage. In at least one embodiment, the MD updates recorded in the in-memory MD log can be destaged to the MD page store in a two phase destage. Such destaged MD updates can be applied to an existing MD page of the MD page store to generate an updated or current MD page. In a first phase of the destage, the MD updates can be destaged to non-volatile storage and stored in a tablet. Each tablet can generally be a row structured form or presentation of the various individual MD updates from the in-memory MD log instance just destaged in the first phase. The system can have multiple tablets stored on non-volatile storage, where each of the multiple tablets corresponds to a different destaged instance of an in-memory MD log. In at least one system, the in-memory MD log can further include an active instance and an inactive (e.g., destaging or frozen) instance. MD updates can be recorded in a first instance which is currently active. A second instance of the in-memory MD log can be inactive and can include MD updates being destaged in the first destage phase. Once the first active instance becomes full, a tablet switch can be performed where the first instance can transition to inactive and can be destaged to non-volatile storage and stored as a new tablet. Also in connection with the tablet switch, the second instance, previously inactive and now destaged as a table, can now transition to active while the first instance is destaging in the first phase. The foregoing role switching of active and inactive between the two in-memory MD log instances can occur in a continual manner as the currently active instance becomes full, and as the currently inactive instance is destaged as a tablet in the first phase of destaging.

When multiple tablets have been destaged by the first phase, a second phase of the destage can be performed. In the second phase of the destage, the MD updates from the multiple destaged tablets can be aggregated and applied to the existing versions of MD pages from the MD page store to generate updated MD pages. Subsequently, the updated MD pages can be persistently stored in the MD page store (thereby replacing the prior existing versions of the MD pages). In at least one embodiment, the second destage phase can process the aggregated multiple tablets as a batch where storage of the multiple tablets is not reclaimed until the second destage phase has completed for all such tablets of the batch.

In at least one system, both the in-memory MD log instances and the tablets can include buckets of MD updates, where each bucket includes updates made to a unique corresponding MD page. Thus, the updates to a particular MD page can be stored in a corresponding bucket of the in-memory MD log and, when destaged in the first phase, also a corresponding bucket of the destaged tablet. When a bucket of the active in-memory MD log for a MD page becomes full, such as by reaching a maximum size X, the active in-memory MD log instance can transition to inactive and be destaged in the first phase. The foregoing first phase of destaging can be triggered since the bucket of the in-memory MD log has recorded a number of MD updates which, when destaged to a tablet, cannot occupy more than the maximum amount of allocated storage denoted by X. Thus when any single bucket of the active instances of in-memory MD log reaches the maximum size X, the active instance of the in-memory MD can be made frozen or inactive and then destaged as a tablet in the first phase of destaging.

Systems, such as data storage systems, can delay some operations in order to perform them more efficiently in an aggregated manner and/or performed at a particular time (e.g., when the system is idle or has a relatively low workload) when the system has available resources to better perform such operations. Operations such as delayed storage reclamation and delayed processing of aggregated tablets of MD updates noted above are examples of such delayed operations that can be performed more efficiently in aggregation, for example, to reduce CPU time and reduce the number of disk accesses. Collection of such delayed operations can also be referred to as debt.

In at least one embodiment, debt in connection with delayed MDL (MD log) updates can be accumulated or collected in an MDL tier of non-volatile storage. In at least one embodiment as noted above, the in-memory MD log instances can be demoted in the first phase of destaging where the in-memory MD log instances are stored as corresponding tablets in the MDL tier. In this sense, demotion with the first destage phase can correspond to storing an in-memory MD log instance as a corresponding tablet in the MDL tier (sometimes referred to as the MDL tablets tier) of non-volatile storage.

The MD updates as stored in the MD log can include multiple types of MD update operations. In at least one embodiment, the MD updates can include a decrement reference count, or "decref" operation type. The decref MD update (sometimes also referred to as the decref delta or simply decref) can generally be an operation to decrement a reference count (sometimes referred to as refcount) of a MD page. In at least one embodiment of a storage system providing data deduplication, the reference count can denote a number of references to a particular data block of stored content C1. In this manner, the reference count can denote the number of times that a single instance of stored content C1 is referenced in user data such as across one or more user data sets or storage objects which have been deduplicated. Thus in at least one embodiment, a decref MD update can be one of the MD updates performed for a write I/O operation that overwrites a target location LA1 of existing content C1 with updated contents C2. In this example, the decref MD update can be performed with respect to a reference count associated with C1 as a result of overwriting C1, as stored at LA1, with C2, such that LA1 is updated to now store C2.

As a result of the foregoing overwrite of LA1 by the write I/O, there can be one less reference to content C1 as denoted by the decref MD update of the reference count with respect to C1, where such decref MD update decrements by one (1) the reference count associated with C1.

To obtain an acceptable amount of amortization in connection with the decref MD update type, it can be desirable to accumulate debt related to decrefs for a longer period of time than other MD update types. As a result in at least one embodiment in accordance with the techniques of the present disclosure, a system can maintain and utilize two MDLs and also two MDL tiers of non-volatile storage for storing tablets of demoted in-memory MDL instances. In at least one embodiment, the two MDLs can include: a first MDL for only decref MD updates and a second MDL for all other remaining types of logged MD updates. The first MDL of only decref MD updates can also be referred to as a decref MDL, where at least one embodiment can include both in-memory and persistent decref MDL instances. The second MDL of other MD update types can be referred to as a common or non-decref MDL, where at least one embodiment can include both in-memory and persistent common MDL instances. In at least one embodiment, the two MDL tiers of non-volatile storage can include: a first MDL tier, referred to as a decref tier or decref MDL tier, including only tablets of demoted decref MD updates from frozen or inactive in-memory decref MDL instances (e.g., as a result of the first destage phase or destage phase 1); and a second MDL tier, referred to as a common MDL tier, including tablets of other types of demoted MD updates from frozen or inactive in-memory common MDL instances (e.g., as a result of the first destage phase). Thus, the in-memory decref MDL instances that are demoted in the first destage phase can be stored as corresponding tablets of decref MD updates (e.g., decref tablets) in the decref tier; and the in-memory common MDL instances that are demoted in the first destage phase can be stored as corresponding tablets of MD updates in the common MDL tier. In this manner in at least one embodiment, the amount of decref debt collected in the dedicated decref tier can be increased to provide for increased aggregation of decref MD updates of the decref tier in the second destage phase.

When the decref tier becomes full, demoting any further in-memory decref MDL instances as part of the first destage phase is not possible. Additionally, further destaging tablets of decref MD updates from the decref tier in the second destage phase can be performed at a high level of granularity with a large number of decref tablets aggregated in a single batch. Thus in some cases, such as when there is a high system workload and/or a burst of a large amount of decref MD updates, the second destage phase as applied to the decref tier cannot be completed as quickly as desired which can further contribute to the decref tier becoming full or out of storage.

In efforts to avoid scenarios where the decref tier becomes full and runs out of storage and can potentially result in data unavailability, the decref tier can be overprovisioned to include a large amount of additional storage. The additional storage can be estimated, for example, based on expected usage in various edge case scenarios. In connection with the overprovisioning, one drawback is that the additional storage can generally remain unused other than in rare occurrences of edge case scenarios. However, even if there is a large amount of storage overprovisioning in the decref tier, there is still no guarantee that the decref tier will not become full and run out of storage in extreme edge case scenarios.

To overcome the foregoing and other drawbacks, the present disclosure describes a bypass destage technique where an in-memory MDL, such as the in-memory decref MDL, can be processed and directly applied to the one or more MD pages of the MD page store. In at least one embodiment, the bypass destage technique provides for directly destaging the in-memory decref MDL to the MD page store and bypassing the decref tier. In at least one embodiment, the bypass destage technique provides for directly destaging the in-memory decref MDL to the MD page store and bypassing or omitting a first phase of a two-phase destage process, where the first phase includes storing the in-memory decref MDL to the decref tier, and where omitting the first phase includes omitting the step of storing the in-memory decref MDL to the decref tier.

With the bypass destage approach of the present disclosure in at least one embodiment, decrefs of the in-memory decref MDL instances can be applied and stored directly in the MD store without storing the in-memory decref MDL instances as tablets on the decref tier and without aggregating decrefs across multiple in-memory decref MDL instances.

In at least one embodiment, the bypass destage technique of the present disclosure can be performed when the decref tier is full or out of storage (OOS) and when there is a current frozen in-memory decref MDL that cannot be demoted to the decref tier (due to the OOS state of the decref tier). Using the bypass destage technique in such an embodiment allows the decref debt of the decref tier to grow to a desirable large target number of decref tablets while providing protection and handling of edge case scenarios resulting in the OOS state of the decref tier. In at least one embodiment, the bypass destage technique of the present disclosure can be performed when a frozen or inactive in-memory decref MDL generally is unable to be demoted to the decref tier in the first phase of normal regular two-phase destaging. In at least one embodiment, the in-memory decref MDL may not be able to be demoted to the decref tier due to any one or more of the following: the decref tier has an insufficient amount of storage; and the decref tier is inaccessible or unavailable such as due to a drive failure or other failure.

In at least one embodiment of the techniques of the present disclosure, the decrefs or decref MD updates are not idempotent in that repeatably applying or destaging the same decref is not acceptable and where repeated application of the same decref MD update(s) can result in MD page corruption. In at least one embodiment in order to protect a MD page from repeated application of the same decrefs, a version or identifier (ID) can be included in a persisted MD page of the MD page store denoting the most recent version of the decref tablet or in-memory decref MDL applied to the persisted MD page. In at least one embodiment, each in-memory decref MDL can be assigned a unique version or ID such as a next integer or numeric value in a monotonically increasing series or sequence. The version or ID denoting the decref version or ID of an in-memory decref MDL can remain with the in-memory decref MDL instance when destaged and thus demoted and stored as a corresponding decref tablet of the decref tier. In this case, the relative age, time order or recency of decref tablets and in-memory decref MDLs can be denoted using decref versions or IDs, where the highest decref version or ID can denote the newest or most recent set of decrefs across all decref tablets and in-memory decref MDL instances.

In at least one embodiment, when multiple frozen in-memory decref MDLs are destaged in connection with the normal two phase destage processing (e.g., non bypass destaging), such frozen in-memory decref MDLs are thus demoted and stored as decref tablets in the decref tier in a first destage phase. Subsequently in a second destage phase, a specified number of the decref tablets of the decref tier can be aggregated and applied to a currently stored version of a MD page from the MD page store to generate an updated MD page. In connection with the second destage phase in at least one embodiment, the updated MD page can be stored in the MD page store along with an updated version or ID of the latest or most recent (e.g., newest) decref tablet applied to the updated MD page. In at least one embodiment, the updated version or ID corresponding to latest or newest decref tablet applied to the MD page can be the largest or maximum decref tablet version or ID of all decref tablets applied to the MD page. In at least one embodiment, processing can ensure that only decref tablets and/or decref MDL instances having an associated version or ID that is larger than the maximum stored decref tablet version or ID are subsequently applied to the MD page to avoid repeated application of the same decrefs such as from the same decref tablet. In at least one embodiment, the active in-memory decref MDL can be the newest of all decref tablets and in-memory decref MDLs whereby the active in-memory decref MDL has the largest decref tablet version or ID of all decref tablets and in-memory decref MDLs currently in the system.

In at least one embodiment, the techniques of the present disclosure with bypass destaging can include creating an updated MD page by applying both common MD updates and decref MD updates or decrefs. In at least one embodiment, the MD updates applied to the MD page can include relevant MD updates from the frozen and active in-memory decref MDLs, the frozen and active in-memory common MDLs, and the common MDLs tablets from the common MDL tier. In at least one embodiment, the MD updates applied to the MD page can omit or exclude MD updates of the decref tier, where the updated MD page can generally include all MD updates except those of the decref tier. In at least one embodiment, any MD updates or deltas (e.g., such as from the common MDL) ingested prior to a particular decref can also be applied and processed prior to the particular decref. However, in at least one embodiment, the decrefs processed as part of bypass destaging can be generally processed in any order so long as all common MD updates ingested prior to each particular decref are applied and processed prior to the particular decref.

In at least one embodiment of the techniques of the present disclosure, a drop delta indicator can be used to indicate that all decrefs or decref MD updates, for a particular MD page, that are ingested prior to the drop delta indicator can be omitted, skipped or ignored when constructing a current or up to date version of the particular MD page. In at least one embodiment, the drop delta indicator can be associated with the particular MD page and can identify a corresponding decref version or ID of a frozen or inactive in-memory decref MDL being destaged using bypass destage processing.

In at least one embodiment, a current version of the particular MD page can be constructed in connection with regular or normal destaging (e.g., non-bypass destaging), such as using the two phase destage, by applying MD updates to the particular MD page version stored persistently in a MD page store. In at least one embodiment, a current version of the particular MD page can be constructed in connection with a read cache miss occurrence with respect to the particular MD page. In response to the current version of the particular MD page not being in cache, the current version of the particular MD page can be constructed and returned to the requester or client in response to the read request that triggered the read cache miss of the particular MD page. In at least one embodiment, the newly constructed current version of the particular MD page can also be stored persistently in the MD page store and/or stored in cache for subsequent use in connection with servicing subsequent read requests for the particular MD page.

In at least one embodiment, the drop delta indicator can be used as a mechanism to avoid reapplication of decrefs in connection with recovery processing performed subsequent to aborting the bypass destage of the frozen in-memory decref MDL. Such recovery processing can include resuming the aborted bypass destage processing of the frozen in-memory decref MDL. In at least one embodiment, the drop delta indicator can be implemented as a type of MD tuple or delta. In at least one embodiment of the techniques of the present disclosure using the bypass destage to destage a frozen (e.g., inactive) in-memory decref MDL, a drop delta indicator can be used to indicate that decrefs of the frozen in-memory decref MDL for a particular MD page can be omitted, skipped or ignored when constructing a current or up to date version of the particular MD page. In at least one embodiment, the drop delta indicator can be associated with the particular MD page and also the corresponding decref tablet version or ID of the frozen in-memory decref MDL including the decrefs to be omitted, skipped or ignored. In at least one embodiment, the drop delta indicator can be inserted in the active in-memory decref MDL in a bucket corresponding to the particular MD page after bypass destage processing has applied relevant decrefs from the frozen in-memory decref MDL to the persisted version of the MD page. Recovery processing in which the bypass destage is continued after being aborted can examine the active in-memory decref MDL for a particular MD page. If the active in-memory decref MDL includes a drop delta indicator for a particular MD page, bypass destage will skip or omit applying the decrefs to the particular MD page since the existence of the foregoing drop delta indicator means that the bypass destage (prior to being aborted) has already applied decrefs of the frozen in-memory decref MDL to the particular MD page.

In at least one embodiment, decrefs can be stored in buckets of an in-memory decref MDL where each bucket can correspond uniquely to a single MD page. Thus, the bucket can include decrefs or decref MD updates to be applied to a single corresponding MD page. In at least one embodiment, each bucket of the in-memory decref MDL can be stored in ingest time order denoting the time order in which the decrefs for the corresponding MD page are received by the MD log architecture, system or infrastructure. When performing the bypass destage techniques of the present disclosure in at least one embodiment, an updated version of the MD page P1 can be created by applying relevant MD updates from a corresponding bucket B1 of: the inactive or frozen in-memory decref MDL, the active in-memory decref MDL, the active in-memory common MDL, the inactive or frozen in-memory common MDL, and the common MDL tier (e.g., apply all relevant MD updates for MD page P1 except those of the decref tier). The currently frozen in-memory decref MDL can have an associated decref version or ID of X1. The currently active in-memory decref MDL can have an associated decref version or ID of X1+1. In at least one embodiment as a result of applying decrefs of the currently frozen in-memory decref MDL X1 to MD page P1, a drop delta indicator can be placed as an entry in the bucket B1 (corresponding to the MD page P1) of the active in-memory decref MDL. The drop delta indicator can be associated with the particular MD page P1 and can also identify the corresponding decref version or ID of X1 of the frozen in-memory decref MDL. In at least one embodiment, the foregoing drop delta indicator denoting the MD page P1 and the decref tablet version or ID X1 (of the frozen in-memory decref MDL) can be written or stored in the corresponding bucket B1 of the active in-memory decref MDL (having associated tablet ID of X1+1) since further updates cannot be made to an in-memory MDL once frozen.

In at least one embodiment, the bypass destage processing can abort for any one of a variety of reasons such as, for example, due to a failure or an occurrence of a high-availability event. Subsequently, the system can restart or reboot and perform recovery processing to continue with the bypass destage processing of the in-memory frozen decref MDL with ID=X1 that was previously aborted. Since application of decrefs are not idempotent and cannot be repeatedly applied, bypass destage processing resumed after system restart or reboot can avoid reapplication of decrefs to the MD page P1 (that were previously applied in connection with the bypass destage). In at least one embodiment, bypass destage processing can ignore or skip previously applied decrefs of the in-memory frozen decref MDL with the decref tablet ID=X1 based, at least in part, on the drop delta indicator previously stored in the active in-memory decref MDL. The drop delta indicator previously stored in the active in-memory decref MDL: 1) can include the decref tablet ID=X1 thereby identifying the in-memory frozen decref MDL with the decref tablet ID=X1; 2) can be included in bucket B1 for MD page P1 of the active in-memory decref MDL. In this case, the bypass destage processing for MD page P1 of the frozen in-memory decref MDL with tablet ID=X1 can check the active in-memory decref MDL for the relevant drop delta indicator (denoting the MD page P1 and denoting the frozen in-memory decref MDL with tablet ID=X1). If the active in-memory decref MDL includes the relevant drop delta indicator, destage processing can skip applying decrefs to MD page P1 since such decrefs have already been applied to MD page. In at least one embodiment, such skipped or omitted decrefs can include those of the in-memory active decref MDL and those of the in-memory frozen decref MDL with decref tablet ID=X1 as denoted by the drop delta indicator of bucket B1 (corresponding to MD page P1) of the in-memory active decref MDL. In such an embodiment, all the omitted or skipped decrefs corresponding to the drop delta indicator have been previously applied to MD page P1 in connection with the bypass destage processing of the frozen in-memory decref MDL.

In at least one embodiment, at a later point in time after bypass destage is completed for the frozen in-memory decref MDL with decref tablet ID=X1, the active in-memory decref MDL (with the decref tablet ID of X1+1) can become full, frozen and destaged as a decref tablet also having the decref ID of X1+1 such as in the two phase destage discussed herein. In order for the current two phase destage of decref tablet X1+1 to create an up to date version of the MD page P1 and avoid reapplication of decrefs of B1 of the decref tablet X1+1 to the MD page P1 (that were previously applied in connection with the bypass destage), the two phase destage of decref tablet X1+1 can ignore or skip decrefs based, at least in part, on the drop delta indicator included in decref tablet X1+1 in the bucket B1 corresponding to the MD page P1. In this case in at least one embodiment, the two phase destage processing can skip applying particular decrefs to MD page P1 where the particular decrefs skipped or omitted are those ingested prior to the drop delta indicator of bucket B1 of MD page P1. In at least one embodiment, the decrefs skipped can include decrefs of bucket B1 of decref tablet X1+1 that are ingested prior to the drop delta indicator. Additionally in at least one embodiment, the decrefs skipped can include relevant decrefs for MD page P1 of decref tablet X1, where "X1" can be identified in the drop delta indicator. In such an embodiment, all the omitted or skipped decrefs denoted by the drop delta indicator have been previously applied to MD page P1 in connection with the bypass destage processing. In at least one embodiment, the up to date version of the MD page P1 can be constructed by reading a current persisted version of the MD page P1 from the MD page store, and applying relevant updates to generate the up to date version of P1. The current persisted version of P1 can have an associated persisted common tablet ID or version and a persisted decref tablet ID or version, both of which denote the most recently applied tablets of MD updates to P1. As such in at least one embodiment, creating an up to date version of P1 can generally omit applying MD updates from a common tablet or in-memory common MDL with an associated common tablet ID that is equal to or less than the persisted common tablet ID; and can generally omit applying MD updates from a decref tablet or in-memory decref MDL with an associated decref tablet ID that is equal to or less than the persisted decref tablet ID.

The foregoing and other aspects of the techniques of the present disclosure are described in more detail in the following paragraphs.

Referring to the FIG. 1, shown is an example of an embodiment of a SAN10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

An embodiment of a data storage system in accordance with techniques herein can perform different data processing operations or services on user data stored on the data storage system. For example, in at least one embodiment in accordance with the techniques herein, a data storage system can provide different data replication technologies, facilities or services. Such replication technologies may be characterized as local or remote. Additionally, a replication technology can provide for creating a complete, physical bit for bit copy of data (that is local and/or remote). A replication technology can provide for creating a logical or virtual point in time copy of a data source such as using a snapshot technology or facility known in the art. Such logical copies of a data source are not a complete physical copy of the data source. Rather, different techniques such as a snapshot technique can be used to create a logical or virtual copy of the data source. For example, a snapshot facility may be used in an embodiment in accordance with techniques herein to create a snapshot characterized as a logical point in time copy of data such as of a LUN or other storage object or entity. In connection with a logical device, or more generally any storage object or entity, software of a data storage system can provide one or more data replication services or facilities whereby a snapshot is one such facility that can be used to create point in time snapshot of a logical device such as a LUN for non-disruptive backup. A snapshot can appear like a normal logical device and can be used for backup, testing, and the like. In at least one embodiment, I/O operations such as read and write can be issued to a snapshot such as of a LUN. In at least one embodiment, the snapshot facility may be characterized as a local replication facility or service that takes snapshots of storage objects in a single data storage system. A local replication facility can be contrasted with a remote replication facility that provides for remote replication of storage objects from a source site or data storage system to a remote site or data storage system. Remote replication facilities provide remote copies of the storage objects for use in connection with data unavailability or disaster of the source site.

Snapshots of a source logical device or LUN can rely, for example, on copy on first write (COFW) and other techniques to track source logical device changes from the time when a snapshot was created. Any writes to the source logical device can result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device can be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device can be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

Figure 2:
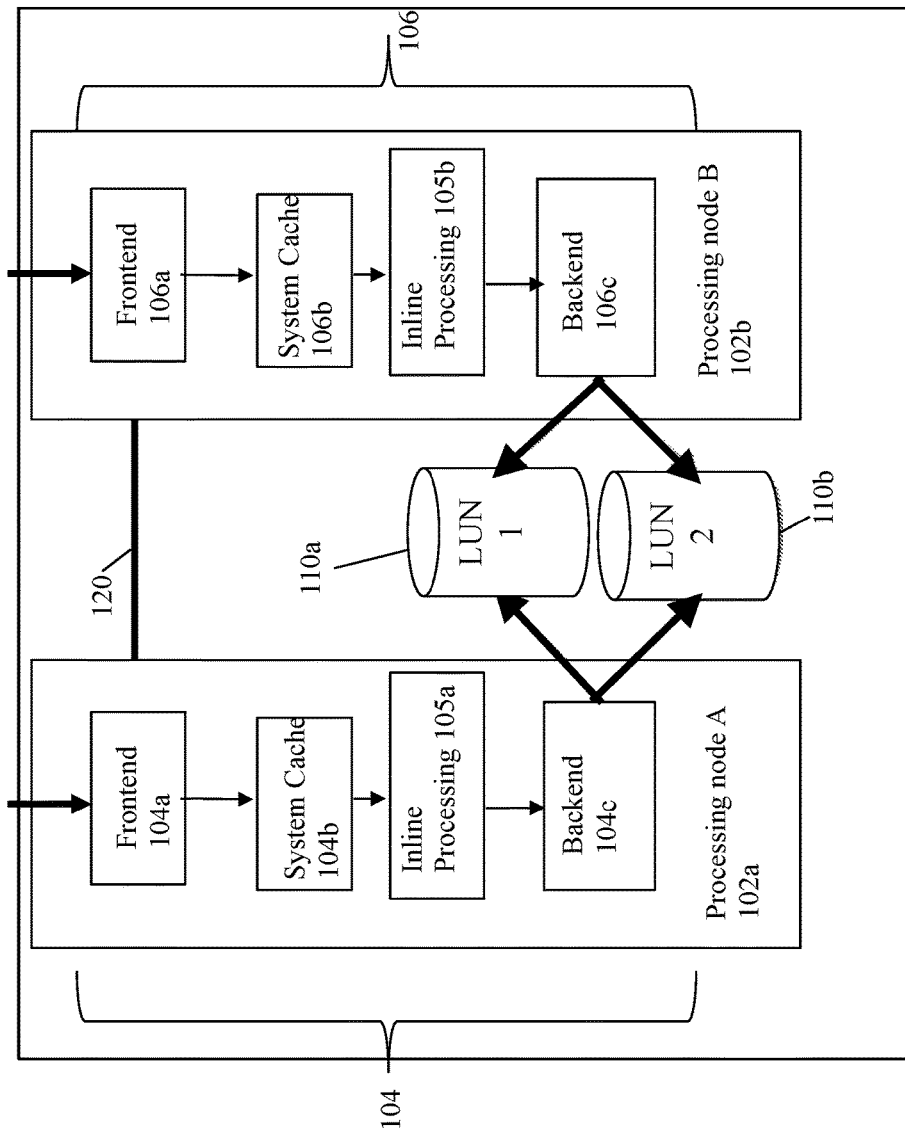
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2, for write operations, latency can be affected by the amount of time taken to store the write data in the log where the write data is visible to both nodes or controllers of the system.

Consistent with other discussion herein, the log file can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
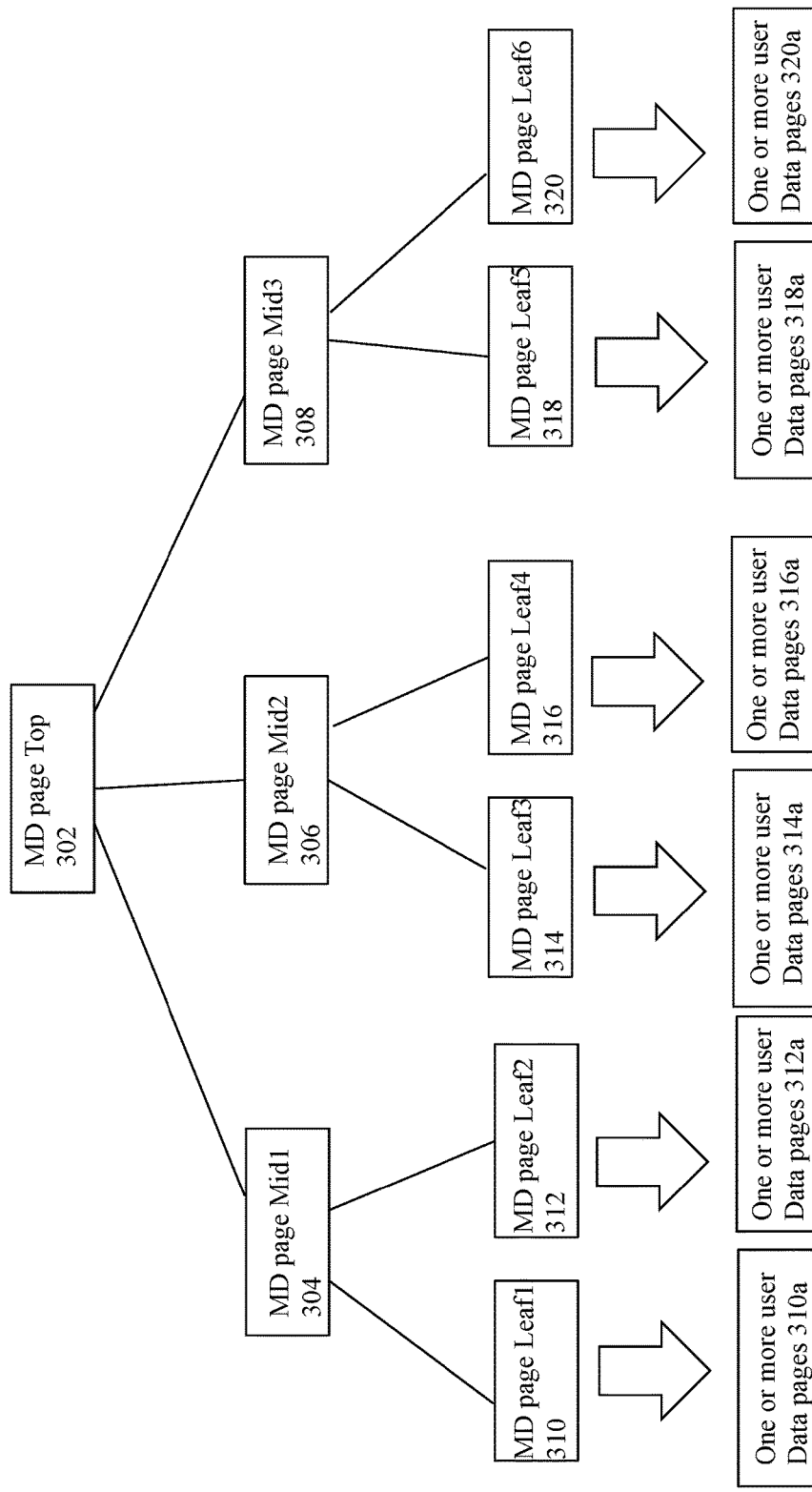
FIGS. 3, 4, 5 and 6 are examples of mapping information in the form of a metadata structure that can be used in connection with mapping logical addresses to physical addresses or storage locations in at least one embodiment in accordance with the techniques of the present disclosure.

In at least one embodiment, the mapping structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes.

For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310*a* denotes data pages for LBAs 0-511; the element 312*a* denotes data pages for the LBAs 512-1023; the element 314*a* denotes data pages for LBAs 1024-1535; the element 316*a* denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
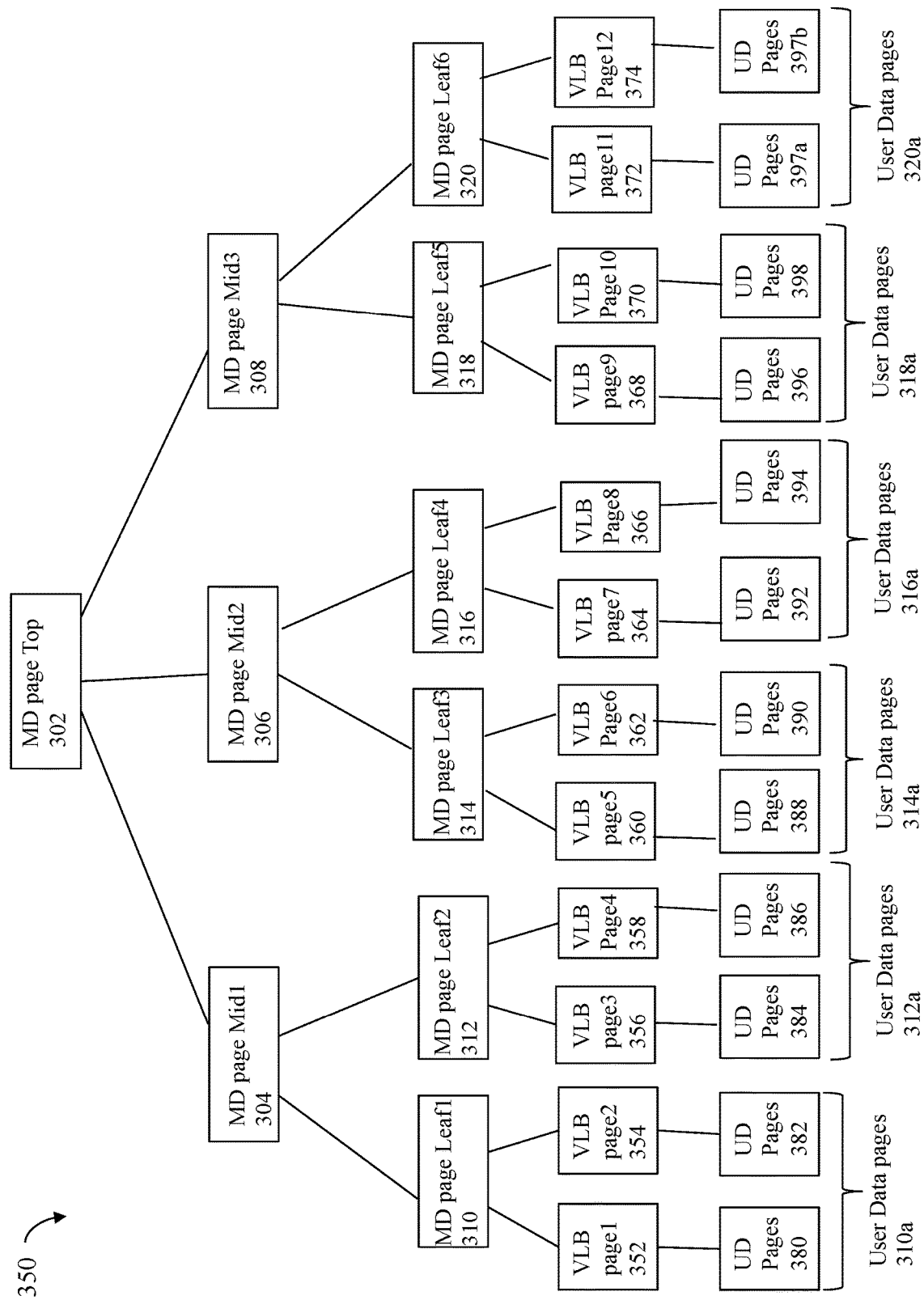

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310*a* of FIG. 3 including data for LBAs 0-511. The UD pages 384 and 386 denote two portions of UD pages corresponding to UD pages 312*a* of FIG. 3 including data for LBAs 512-1023. The UD pages 388 and 390 denote two portions of UD pages corresponding to UD pages 314*a* of FIG. 3 including data for LBAs 1024-1535. The UD pages 392 and 394 denote two portions of UD pages corresponding to UD pages 316*a* of FIG. 3 including data for LBAs 1536-2047. The UD pages 396 and 398 denote two portions of UD pages corresponding to UD pages 318*a* of FIG. 3 including data for LBAs 2048-2559. The UD pages 397*a* and 397*b* denote two portions of UD pages corresponding to UD pages 320*a* of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
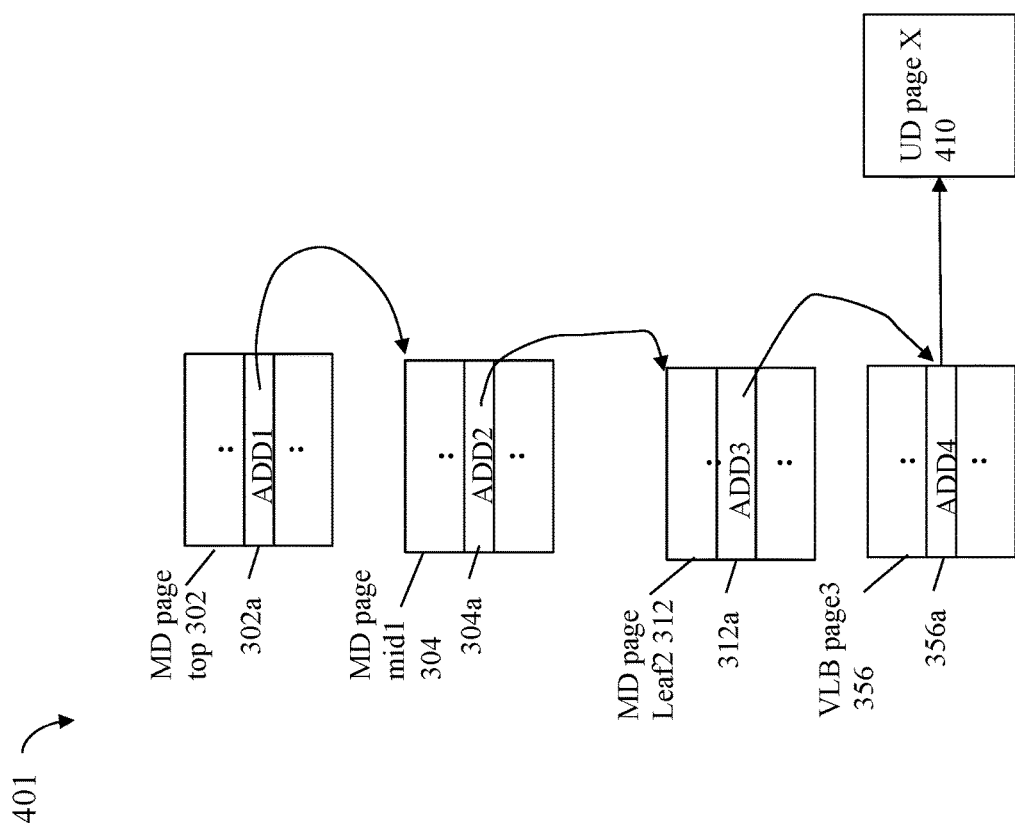

Referring to FIG. 5, shown is a more detailed representation 401 of the MD pages of the sequence traversed to access the UD page X 384 included in the set of UD pages 312*a*. As noted above, the MD page sequence includes MD page 302, MD page 304, MD page 312, and VLB page3 356. In the example 401, MD page top 302 includes an entry or address 302*a* that points to or references the MD page mid1 304. In at least one embodiment, the starting entry 302*a* in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302*a* having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 401, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 401 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
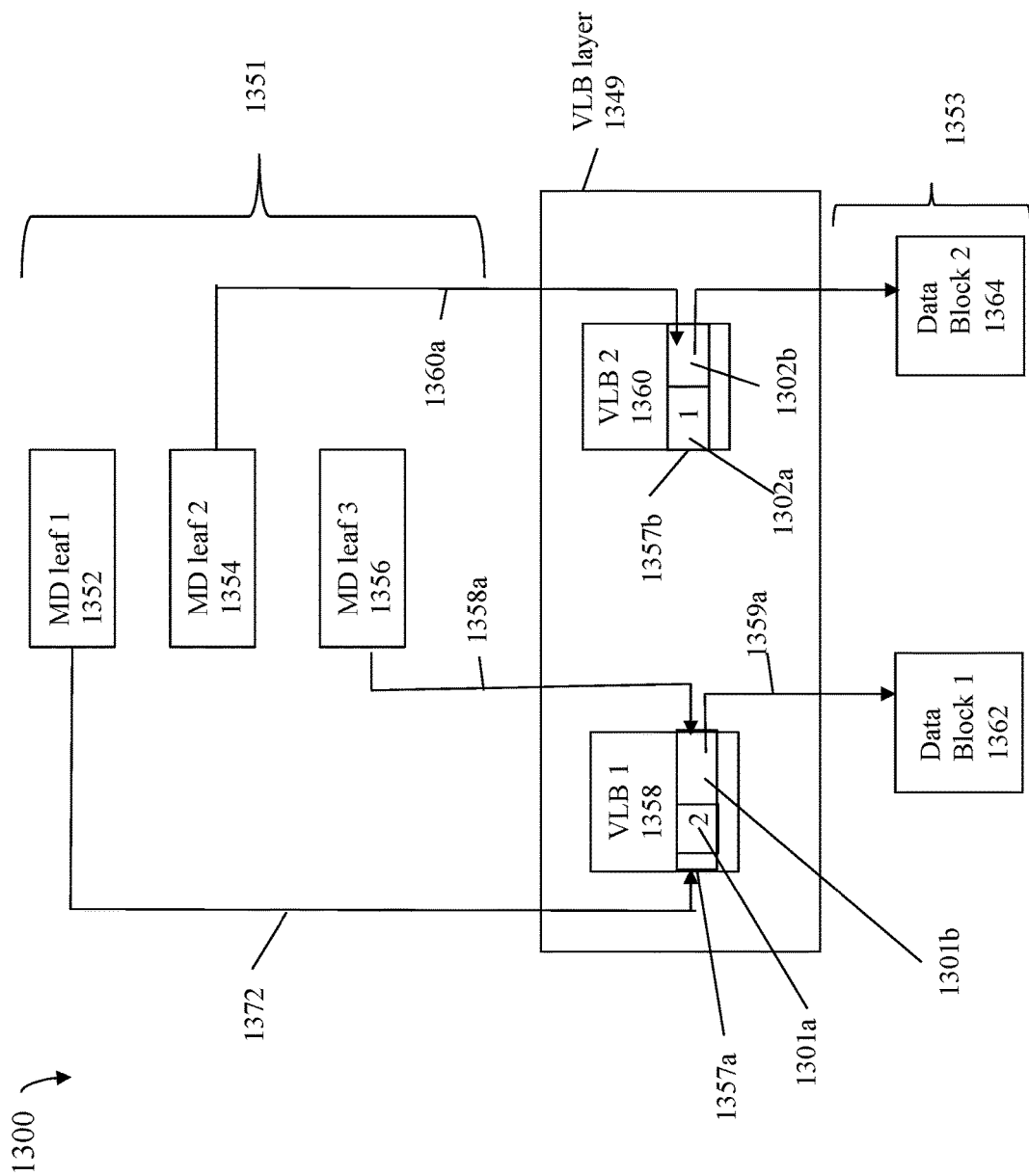

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB2 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

The reference count 1301a can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360*a*) to the VLB entry 1357*b* associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6. In at least one embodiment, the MD or mapping information used in connection with stored user data can y be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses;

DECREF or "decrement reference count operation" denoting an update to decrement by 1 a reference count of a VLB entry associated with a data block containing content that may be stored at one or more logical addresses. Generally, an embodiment can include any suitable number of predefined types that may vary with the supported updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7:
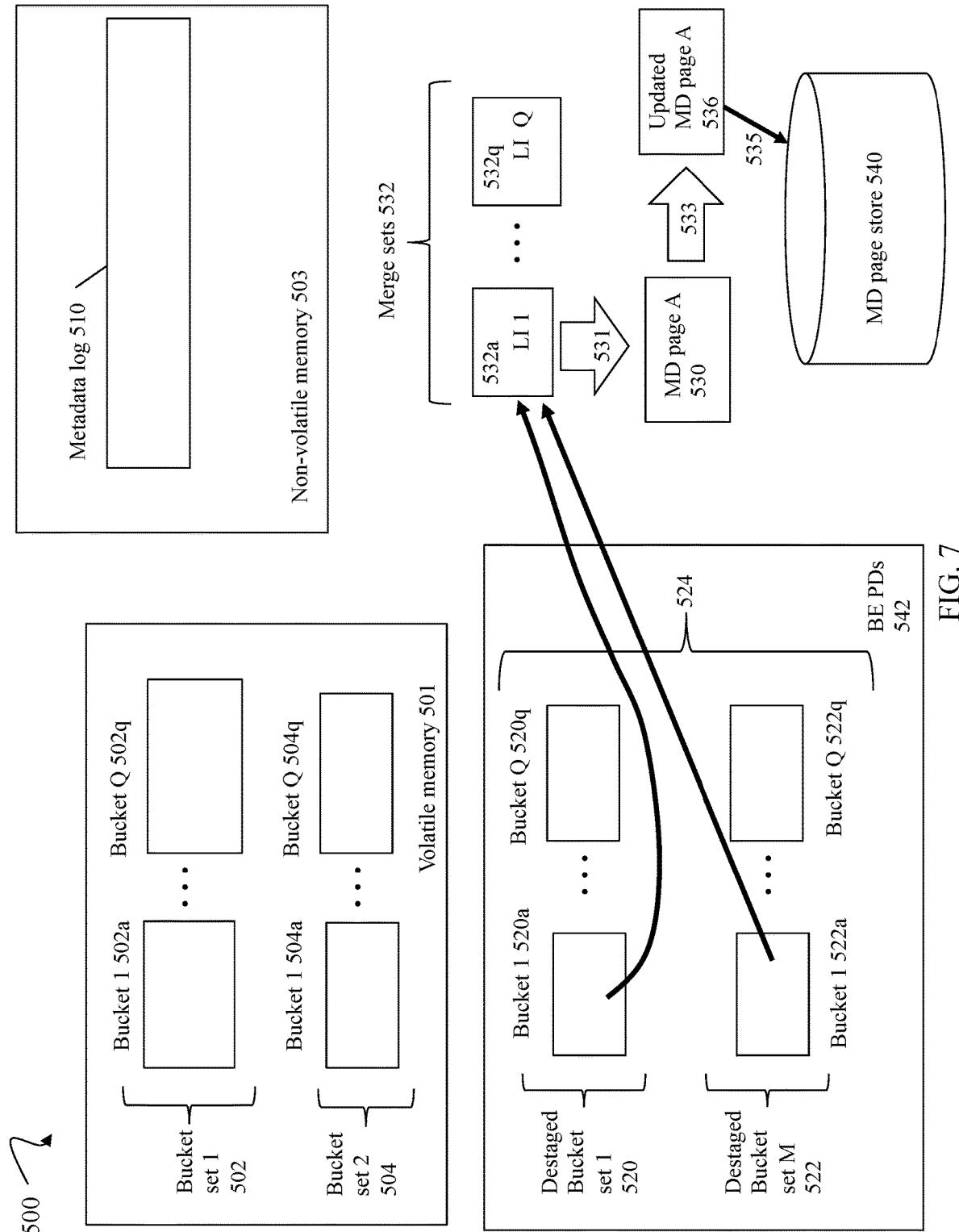
FIG. 7 is an example illustrating structures and associated data flow in at least one embodiment in accordance with the techniques of the present disclosure.

Referring to FIG. 7, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art and described elsewhere herein in more detail such as, for example, in connection with FIG. 8. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

The following paragraphs describe a bypass destage technique of the present disclosure where an in-memory MDL, such as the in-memory decref MDL, can be processed and directly applied to the one or more MD pages of the MD page store. In at least one embodiment, the bypass destage technique provides for directly destaging the in-memory decref MDL to the MD page store and bypassing the decref tier. In at least one embodiment, the bypass destage technique provides for directly destaging the in-memory decref MDL to the MD page store and bypassing or omitting a first phase of a two-phase destage process, where the first phase includes storing the in-memory decref MDL to the decref tier, and where omitting the first phase includes omitting the step of storing the in-memory decref MDL to the decref tier.

With the bypass destage approach of the present disclosure in at least one embodiment, decrefs of the in-memory decref MDL instances can be applied and stored directly in the MD store without storing the in-memory decref MDL instances as tablets on the decref tier and without aggregating decrefs across multiple in-memory decref MDL instances.

In at least one embodiment, the bypass destage technique of the present disclosure can be performed when the decref tier is full or out of storage (OOS) and when there is a current frozen in-memory decref MDL that cannot be demoted to the decref tier (due to the OOS state of the decref tier). Using the bypass destage technique in such an embodiment allows the decref debt of the decref tier to grow to a desirable large target number of decref tablets while providing protection and handling of edge case scenarios resulting in the OOS state of the decref tier. In at least one embodiment, the bypass destage technique of the present disclosure can be performed when a frozen or inactive in-memory decref MDL generally is unable to be demoted to the decref tier in the first phase of normal regular two-phase destaging. In at least one embodiment, the in-memory decref MDL may not be able to be demoted to the decref tier due to any one or more of the following: the decref tier has an insufficient amount of storage; and the decref tier is inaccessible or unavailable such as due to a drive failure or other failure.

In at least one embodiment of the techniques of the present disclosure, the decrefs or decref MD updates are not idempotent in that repeatably applying or destaging the same decref is not acceptable and where repeated application of the same decref MD update(s) can result in MD page corruption. In at least one embodiment in order to protect a MD page from repeated application of the same decrefs, a version or identifier (ID) can be included in a persisted MD page of the MD page store denoting the most recent version of the decref tablet or in-memory decref MDL applied to the persisted MD page. In at least one embodiment, each in-memory decref MDL can be assigned a unique version or ID such as a next integer or numeric value in a monotonically increasing series or sequence. The version or ID denoting the decref version or ID of an in-memory decref MDL can remain with the in-memory decref MDL instance when destaged and thus demoted and stored as a corresponding decref tablet of the decref tier. In this case, the relative age, time order or recency of decref tablets and in-memory decref MDLs can be denoted using decref versions or IDs, where the highest decref version or ID can denote the newest or most recent set of decrefs across all decref tablets and in-memory decref MDL instances.

In at least one embodiment, when multiple frozen in-memory decref MDLs are destaged in connection with the normal two phase destage processing (e.g., non bypass destaging), such frozen in-memory decref MDLs are thus demoted and stored as decref tablets in the decref tier in a first destage phase. Subsequently in a second destage phase, a specified number of the decref tablets of the decref tier can be aggregated and applied to a currently stored version of a MD page from the MD page store to generate an updated MD page. In connection with the second destage phase in at least one embodiment, the updated MD page can be stored in the MD page store along with an updated version or ID of the latest or most recent (e.g., newest) decref tablet applied to the updated MD page. In at least one embodiment, the updated version or ID corresponding to latest or newest decref tablet applied to the MD page can be the largest or maximum decref tablet version or ID of all decref tablets applied to the MD page. In at least one embodiment, processing can ensure that only decref tablets and/or decref MDL instances having an associated version or ID that is larger than the maximum stored decref tablet version or ID are subsequently applied to the MD page to avoid repeated application of the same decrefs such as from the same decref tablet. In at least one embodiment, the active in-memory decref MDL can be the newest of all decref tablets and in-memory decref MDLs whereby the active in-memory decref MDL has the largest decref tablet version or ID of all decref tablets and in-memory decref MDLs currently in the system.

In at least one embodiment, the techniques of the present disclosure with bypass destaging can include creating an updated MD page by applying both common MD updates and decref MD updates or decrefs. In at least one embodiment, the MD updates applied to the MD page can include relevant MD updates from the frozen and active in-memory decref MDLs, the frozen and active in-memory common MDLs, and the common MDLs tablets from the common MDL tier. In at least one embodiment, the MD updates applied to the MD page can omit or exclude MD updates of the decref tier, where the updated MD page can generally include all MD updates except those of the decref tier. In at least one embodiment, any MD updates or deltas (e.g., such as from the common MDL) ingested prior to a particular decref can also be applied and processed prior to the particular decref. However, in at least one embodiment, the decrefs processed as part of bypass destaging can be generally processed in any order so long as all common MD updates ingested prior to each particular decref are applied and processed prior to the particular decref.

In at least one embodiment of the techniques of the present disclosure, a drop delta indicator can be used to indicate that all decrefs or decref MD updates, for a particular MD page, that are ingested prior to the drop delta indicator can be omitted, skipped or ignored when constructing a current or up to date version of the particular MD page. In at least one embodiment, the drop delta indicator can be associated with the particular MD page and can identify a corresponding decref version or ID of a frozen or inactive in-memory decref MDL being destaged using bypass destage processing.

In at least one embodiment, a current version of the particular MD page can be constructed in connection with regular or normal destaging (e.g., non-bypass destaging), such as using the two phase destage, by applying MD updates to the particular MD page version stored persistently in a MD page store. In at least one embodiment, a current version of the particular MD page can be constructed in connection with a read cache miss occurrence with respect to the particular MD page. In response to the current version of the particular MD page not being in cache, the current version of the particular MD page can be constructed and returned to the requester or client in response to the read request that triggered the read cache miss of the particular MD page. In at least one embodiment, the newly constructed current version of the particular MD page can also be stored persistently in the MD page store and/or stored in cache for subsequent use in connection with servicing subsequent read requests for the particular MD page.

In at least one embodiment, the drop delta indicator can be used as a mechanism to avoid reapplication of decrefs in connection with recovery processing performed subsequent to aborting the bypass destage of the frozen in-memory decref MDL. Such recovery processing can include resuming the aborted bypass destage processing of the frozen in-memory decref MDL. In at least one embodiment, the drop delta indicator can be implemented as a type of MD tuple or delta. In at least one embodiment of the techniques of the present disclosure using the bypass destage to destage a frozen (e.g., inactive) in-memory decref MDL, a drop delta indicator can be used to indicate that decrefs of the frozen in-memory decref MDL for a particular MD page can be omitted, skipped or ignored when constructing a current or up to date version of the particular MD page. In at least one embodiment, the drop delta indicator can be associated with the particular MD page and also the corresponding decref tablet version or ID of the frozen in-memory decref MDL including the decrefs to be omitted, skipped or ignored. In at least one embodiment, the drop delta indicator can be inserted in the active in-memory decref MDL in a bucket corresponding to the particular MD page after bypass destage processing has applied relevant decrefs from the frozen in-memory decref MDL to the persisted version of the MD page. Recovery processing in which the bypass destage is continued after being aborted can examine the active in-memory decref MDL for a particular MD page. If the active in-memory decref MDL includes a drop delta indicator for a particular MD page, bypass destage will skip or omit applying the decrefs to the particular MD page since the existence of the foregoing drop delta indicator means that the bypass destage (prior to being aborted) has already applied decrefs of the frozen in-memory decref MDL to the particular MD page.

In at least one embodiment, decrefs can be stored in buckets of an in-memory decref MDL where each bucket can correspond uniquely to a single MD page. Thus, the bucket can include decrefs or decref MD updates to be applied to a single corresponding MD page. In at least one embodiment, each bucket of the in-memory decref MDL can be stored in ingest time order denoting the time order in which the decrefs for the corresponding MD page are received by the MD log architecture, system or infrastructure. When performing the bypass destage techniques of the present disclosure in at least one embodiment, an updated version of the MD page P1 can be created by applying relevant MD updates from a corresponding bucket B1 of: the inactive or frozen in-memory decref MDL, the active in-memory decref MDL, the active in-memory common MDL, the inactive or frozen in-memory common MDL, and the common MDL tier (e.g., apply all relevant MD updates for MD page P1 except those of the decref tier). The currently frozen in-memory decref MDL can have an associated decref version or ID of X1. The currently active in-memory decref MDL can have an associated decref version or ID of X1+1. In at least one embodiment as a result of applying decrefs of the currently frozen in-memory decref MDL X1 to MD page P1, a drop delta indicator can be placed as an entry in the bucket B1 (corresponding to the MD page P1) of the active in-memory decref MDL. The drop delta indicator can be associated with the particular MD page P1 and can also identify the corresponding decref version or ID of X1 of the frozen in-memory decref MDL. In at least one embodiment, the foregoing drop delta indicator denoting the MD page P1 and the decref tablet version or ID X1 (of the frozen in-memory decref MDL) can be written or stored in the corresponding bucket B1 of the active in-memory decref MDL (having associated tablet ID of X1+1) since further updates cannot be made to an in-memory MDL once frozen.

In at least one embodiment, the bypass destage processing can abort for any one of a variety of reasons such as, for example, due to a failure or an occurrence of a high-availability event. Subsequently, the system can restart or reboot and perform recovery processing to continue with the bypass destage processing of the in-memory frozen decref MDL with ID=X1 that was previously aborted. Since application of decrefs are not idempotent and cannot be repeatedly applied, bypass destage processing resumed after system restart or reboot can avoid reapplication of decrefs to the MD page P1 (that were previously applied in connection with the bypass destage). In at least one embodiment, bypass destage processing can ignore or skip previously applied decrefs of the in-memory frozen decref MDL with the decref tablet ID=X1 based, at least in part, on the drop delta indicator previously stored in the active in-memory decref MDL. The drop delta indicator previously stored in the active in-memory decref MDL: 1) can include the decref tablet ID=X1 thereby identifying the in-memory frozen decref MDL with the decref tablet ID=X1; 2) can be included in bucket B1 for MD page P1 of the active in-memory decref MDL. In this case, the bypass destage processing for MD page P1 of the frozen in-memory decref MDL with tablet ID=X1 can check the active in-memory decref MDL for the relevant drop delta indicator (denoting the MD page P1 and denoting the frozen in-memory decref MDL with tablet ID=X1). If the active in-memory decref MDL includes the relevant drop delta indicator, destage processing can skip applying decrefs to MD page P1 since such decrefs have already been applied to MD page. In at least one embodiment, such skipped or omitted decrefs can include those of the in-memory active decref MDL and those of the in-memory frozen decref MDL with decref tablet ID=X1 as denoted by the drop delta indicator of bucket B1 (corresponding to MD page P1) of the in-memory active decref MDL. In such an embodiment, all the omitted or skipped decrefs corresponding to the drop delta indicator have been previously applied to MD page P1 in connection with the bypass destage processing of the frozen in-memory decref MDL.

In at least one embodiment, at a later point in time after bypass destage is completed for the frozen in-memory decref MDL with decref tablet ID=X1, the active in-memory decref MDL (with the decref tablet ID of X1+1) can become full, frozen and destaged as a decref tablet also having the decref ID of X1+1 such as in the two phase destage discussed herein. In order for the current two phase destage of decref tablet X1+1 to create an up to date version of the MD page P1 and avoid reapplication of decrefs of B1 of the decref tablet X1+1 to the MD page P1 (that were previously applied in connection with the bypass destage), the two phase destage of decref tablet X1+1 can ignore or skip decrefs based, at least in part, on the drop delta indicator included in decref tablet X1+1 in the bucket B1 corresponding to the MD page P1. In this case in at least one embodiment, the two phase destage processing can skip applying particular decrefs to MD page P1 where the particular decrefs skipped or omitted are those ingested prior to the drop delta indicator of bucket B1 of MD page P1. In at least one embodiment, the decrefs skipped can include decrefs of bucket B1 of decref tablet X1+1 that are ingested prior to the drop delta indicator. Additionally in at least one embodiment, the decrefs skipped can include relevant decrefs for MD page P1 of decref tablet X1, where "X1" can be identified in the drop delta indicator. In such an embodiment, all the omitted or skipped decrefs denoted by the drop delta indicator have been previously applied to MD page P1 in connection with the bypass destage processing. In at least one embodiment, the up to date version of the MD page P1 can be constructed by reading a current persisted version of the MD page P1 from the MD page store, and applying relevant updates to generate the up to date version of P1. The current persisted version of P1 can have an associated persisted common tablet ID or version and a persisted decref tablet ID or version, both of which denote the most recently applied tablets of MD updates to P1. As such in at least one embodiment, creating an up to date version of P1 can generally omit applying MD updates from a common tablet or in-memory common MDL with an associated common tablet ID that is equal to or less than the persisted common tablet ID; and can generally omit applying MD updates from a decref tablet or in-memory decref MDL with an associated decref tablet ID that is equal to or less than the persisted decref tablet ID.

The foregoing and other aspects of the techniques of the present disclosure are described in more detail in the following paragraphs.

Consistent with discussion above, and with reference back to FIG. 7, in the following paragraphs the non-volatile metadata log 510 or the persisted metadata log or journal may also be referred to as an RDL or raw persisted or non-volatile MD data log; and a single bucket set, such as each of 502 and 504, of the volatile in-memory metadata log, may also be referred to an HBSB (hash-based sorted buckets). Thus, consistent with discussion above such as with reference back to FIG. 7, each node can have an active HBSB, such as bucket set 502, and an inactive or destaging HBSB, such as bucket set 504. A pair of HBSBs including an active bucket set and an inactive or destaging bucket set, may in some contexts also be referred to collectively as the in-memory or volatile memory MD logs or instances. Thus, as shown in FIG. 7, a storage node can write copies of delta updates as tuples to both the active in-memory MD log and also the RDL. The RDL can persistently store the respective tuples, deltas or MD updates in a time order sequence such as from older to newest. In contrast, MD updates, deltas or tuples stored in an in-memory MD log local to a storage node can be organized in a different manner to facilitate efficient and quick retrieval organized in hash buckets as discussed elsewhere herein. Within an HBSB, each hash bucket including MD updates for a single corresponding MD page, the MD updates, deltas or tuples can be organized in a time order sequence based on when the MD updates are received at the storage node.

Consistent with other discussion herein, the destaged bucket sets 524 can also be referred to herein as tablets. MD updates in the form of deltas or tuples can be stored in the tablets.

In at least one data storage system such as with a dual node configuration, each storage node can maintain local instances of an active in-memory MD log and an inactive in-memory MD log, and where both nodes can share a single instance of the RDL. In the event of disaster, data loss and/or data corruption, a storage node can replay the RDL to apply delta update tuples stored in the RDL to the node's local in-memory MD log to thereby restore or recover the node's in-memory MD log to a valid and consistent state.

In at least one embodiment, the techniques of the present disclosure can use the MD log infrastructure such as described in connection with FIG. 7 to record and process MD page updates. In some contexts used herein, the MD log can generally include both a persistent MD log such as the RDL 510, as well as per node in-memory or volatile MD logs such as the HBSBs 502, 504.

Also consistent with discussion above in at least one embodiment in accordance with the techniques of the present disclosure, MD updates or deltas can be recorded in the active HBSB. When the active HBSB is full or responsive to the existence of another specified trigger condition, a tablet switch or role switch can be performed resulting in the active HBSB being destaged in a first phase also sometimes referred to as "destage1". In particular, the active HBSB can be destaged in destage1 and stored on non-volatile storage, such as an SSD tier, in the tablet. In some instances, the non-volatile storage used for storing destaged tablets can be referred to as an MDL tablets tier or MDL tier. In at least one embodiment, the tablet can generally be a structure which includes rows of information. Thus the recorded MD updates of the active HBSB can be stored in a different structure and presentation on disk as a tablet in the MD tablets tier. Consistent with discussion above, destaging can also include a second phase sometimes referred to as "destage2". Destage2 can include aggregating MD updates across multiple tablets of the MDL tablets tier and then applying the aggregated MD updates to corresponding MD pages of the MD page store. Thus with reference to FIG. 7, an active HBSB (active bucket set) can transition to become the inactive HBSB (inactive bucket set) which is then destaged as denoted by the destaged bucket sets or tablets 524.

In at least one embodiment, an HBSB bucket corresponding to MD updates for a particular MD page can be destaged to a corresponding bucket of a tablet. In at least one embodiment, within each bucket of the HBSB, the bucket corresponding to a particular MD page can store MD updates in time order such as based on when the MD updates are inserted into the bucket and thus when received by the infrastructure. In at least one embodiment, within each bucket of a tablet, the bucket corresponding to a particular MD page can store MD updates for the MD page in increasing time order as in the HBSB.

In at least one embodiment, buckets stored within each single destaged tablet can be accessed and organized based, at least in part, using the unique logical indices or Us of MD pages corresponding to the buckets. In at least one embodiment, the buckets of each single destaged tablet can be stored based on increasing logical indices or Us of MD pages corresponding to the buckets of the destaged tablet.

In at least one embodiment, each bucket of each tablet can be a same size such as, for example, 4K bytes, 8K bytes, 16K bytes, or some other suitable size. The bucket size can be predefined and fixed. In at least one embodiment, the bucket size can be selected with a goal of optimizing efficiency of BE reads such as reading a bucket from the MDL tablets tier in connection with destaging, read miss processing, and other processing described herein. In at least one embodiment, the bucket size can also be selected to account for any needed overprovisioning which can vary with embodiment.

Figure 8:
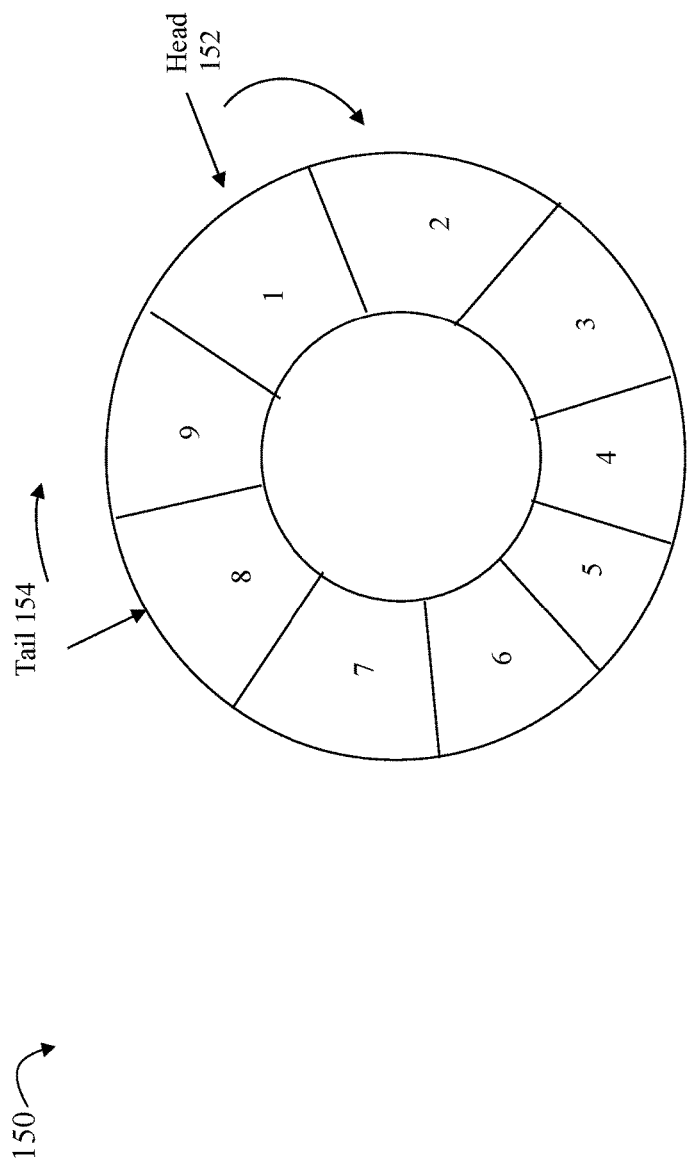
FIG. 8 is an example of a ring buffer in at least one embodiment in accordance with the techniques of the present disclosure.

Referring to FIG. 8, shown is an example 150 illustrating a ring buffer which can be used in at least one embodiment in accordance with the techniques of the present disclosure.

In at least one embodiment in accordance with the techniques of the present disclosure, the entries of the RDL can be organized as a ring buffer such as described in connection with FIG. 7. Additionally, in such an embodiment, the destaged bucket sets or tablets 524 can also be organized as a ring buffer (sometimes simply referred to as a ring).

The ring buffer 150 can be managed using the head pointer 152 and the tail pointer 154. Both pointers are advanced in the clockwise flow in this example. Entries are allocated from the head of the list as denoted by the head pointer 152. For example, the entry 1 can be allocated by the head pointer 152. Subsequently, the head pointer 152 is advanced to the entry 2 since entry 2 is the next entry to be allocated when needed. To further illustrate such as with respect to a ring buffer of tablets 524, the tail pointer 154 can denote the entry in the ring buffer that is to be destaged next or is currently being destaged. For example, the tail pointer 154 is currently pointing to entry 8. Once entry 8 is destaged, the tail pointer 154 is advanced to entry 9. The ring buffer allocates new entries in a FIFO (first in first out) manner from the head pointer based on the sequential positioning in the buffer as denoted by the entry numbers 1 through 9. In at least one embodiment for ring buffer management, both the "full" and "empty" cases of the ring buffer can look the same where the head pointer 152 and the tail pointer are equal or point to the same entry in the ring buffer. In the full case, all entries in the ring buffer are allocated and in the empty case, all entries in the ring buffer are free or available for use. Any suitable technique can be used to distinguish between the full and empty ring buffer cases when the head pointer and the tail pointer point to the same entry. For example, a count can be maintained for the ring buffer denoting the number of allocated entries. The count can be initialized to 0, incremented each time an entry is allocated by the head pointer advancing, and decremented each time an entry is flushed and reclaimed by advancing the tail pointer.

In at least one embodiment, the ring buffer can be implemented using an array or other suitable structure where, for example, the entries 1 through 9 as in FIG. 8 correspond to array indices. The circular nature of the ring buffer can be implemented using the linear array by considering the sequential array indices as if connected end to end or as a contiguous sequential array of elements. Once the head or tail pointer reaches entry 9, the head or tail pointer continues with the next entry in the sequence which is entry 1. In this manner the entries or indices of the linear array form a logical loop or ring as illustrated in the FIG. 8.

Thus in connection with destaged tablets 524 of FIG. 7 which are organized and maintained as a ring buffer such as described in connection with FIG. 8, an inactive HBSB can be destaged as a tablet at the head of the ring buffer, and tablets can be released or deleted from the tail of the ring buffer.

Figure 9:
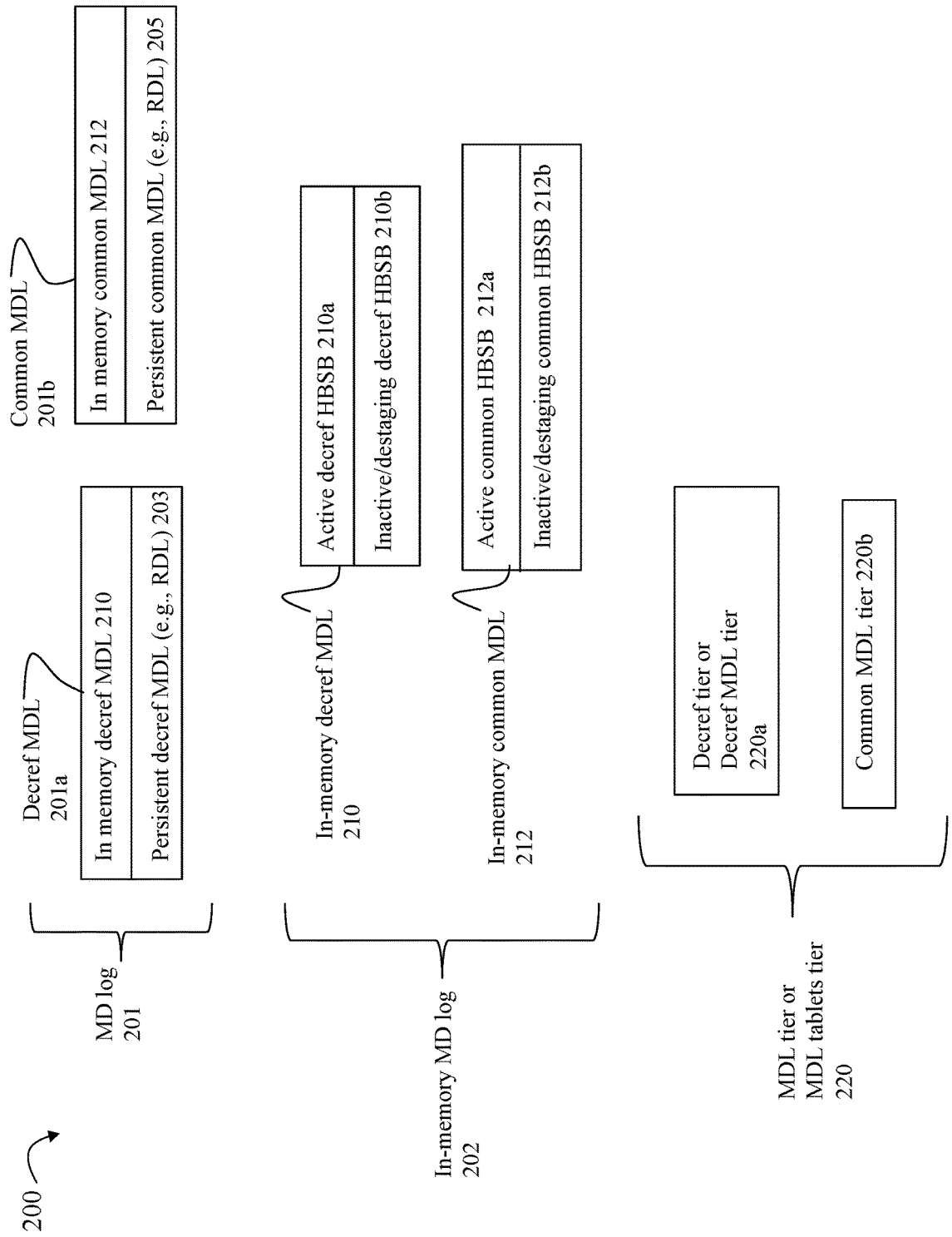
FIG. 9 is an example of various structures and storage tiers in at least one embodiment in accordance with the techniques of the present disclosure.

Referring to FIG. 9, shown is an example 200 of components that may be included in at least one embodiment in accordance with the techniques of the present disclosure.

Consistent with other discussion herein, the MD log (MDL) 201 can collectively be implemented using two MD logs: the decref MDL 201a and the common MDL 201b. The decref MDL 201a can be a dedicated MDL used for recording decrefs or decref MD updates. The common MDL 201b can be used to log or record all other remaining types of non-decref MD updates. The MDLs 201a and 201b can both be maintained and operate consistent with the MDL described herein. In at least one embodiment, each of the MDLs 201a, 201b can include both an in-memory variant and a persistent variant which can also be maintained and operate consistent with discussion herein.

In at least one embodiment, the decref MDL 201a can include both an in-memory decref MDL 210 (such as stored in volatile memory 501 of FIG. 7) and a persistent decref MDL(e.g., RDL) 203 (such as stored in NVRAM 503 of FIG. 7). In at least one embodiment, the common MDL 201b can include both an in-memory common MDL 212 (such as stored in volatile memory 501 of FIG. 7) and a persistent common MDL (e.g., RDL) 205 (such as stored in NVRAM 503 of FIG. 7). As a variation to the foregoing in at least one embodiment, rather than maintain 2 separate persistent RDLs or MDLs 203 and 205, an embodiment can maintain a single persistent MDL or RDL for all MD updates while still maintaining separate in-memory MDLs 210 and 212.

In this manner, the in-memory MD log 202 can collectively be implemented using the in-memory decref MDL 210 and the in-memory common MDL 210. The in-memory decref MDL 210 can be implemented using a pair of HBSBs 210a-b in a manner as described herein in connection with bucket sets 502, 504. In particular, the in-memory decref MDL 210 can include an active decref HBSB 210a and an inactive or destaging (e.g., frozen) decref HBSB 210b. The in-memory common MDL 212 can be implemented using a pair of HBSBs 212a-b in a manner as described herein in connection with bucket sets 502, 504. In particular, the in-memory common MDL 212 can include an active common HBSB 212a and an inactive or destaging (e.g., frozen) common HBSB 212b.

In at least one embodiment, the MDL tier or MDL tablets tier 220 can include a dedicated decref tier or decref MDL tier 220a, and a common MDL tier 220b. Consistent with discussion herein, the tiers 220a-b can denote non-volatile storage tiers used for storing, respectively, decref tablets and common MDL update tablets. Each decref tablet of the decref tier 220s can include decrefs destaged or demoted in a first destage phase from an inactive or frozen in-memory decref HBSB instance 210b. Each tablet of common MDL updates of the common MDL tier 220b can include other types of MD updates (e.g., non-decref types) destaged or demoted in a first destage phase from an inactive or frozen in-memory common HBSB instance 212b.

With reference back to FIG. 6, a decref MD update or tuple can describe a MD update operation to decrement by one (1) a reference count of a particular VLB entry of a particular VLB page. For example, a decref can be a tuple as described herein which decrements by one the current reference count of 2 (1301a) of the entry 1357a of the VLB1 1358. As a result of applying the foregoing decref, the value of the VLB entry 1357a of VLB 1358 can be updated from 2 to 1. Consistent with other discussion herein in at least one embodiment, a decref MD update as represented by a decref tuple can be performed in connection with a write I/O operation in a system that performs data deduplication where, as a result of the write I/O operation, current content C1 of a logical address LA as may be stored in data block 1362 is overwritten with new content C2. As a result of the foregoing write operation, LA no longer references content C1 as included in the data block 1362 thereby causing the reference count 1301a having a value of 2 to be decremented to 1.

Consistent with other discussion herein, in at least one embodiment, a decref MD change or update can be made to a MD page that is a VLB page where the decref may be expressed in the form of a tuple represented as (LI, EI, T, V) where:

LI denotes the logical index of the MD page such as the VLB page. The LI can be a unique index of the VLB page that is updated. The LI can be used to uniquely identify the MD page in the MD or mapping structure such as described elsewhere herein (e.g., FIGS. 3-6).

EI denotes the entry index denoting a particular entry, offset or location in the MD page denoted by LI. In at least one embodiment with the decref tuple, EI can denote the VLB entry of the VLB page that includes the reference count to be decremented; and T denotes the type of metadata update. For example, in at least one embodiment there can be multiple predefined types or allowable values for T. In at least one embodiment, a decref tuple can have an associated DECREF type as the value for T.

In at least one embodiment, a single decref MD update of a single reference count can be represented by a corresponding single decref tuple. In at least one embodiment that supports a decref optimization, a single decref tuple can more generally correspond to one or more decref MD updates or operations. For example, a single decref tuple can correspond to, and encode, two or more decrefs for two or more corresponding reference counts of two or more corresponding VLB entries of the same VLB page.

In at least one embodiment as discussed herein, two MDLs can be maintained for decref and non-decref MD update types. Generally, deltas or MD updates made to a particular MD page can be processed in order of ingest which can be non-trivial to implement in an embodiment where deltas or MD updates to the same MD page are ingested and stored in different MDLs. Decrefs can denote a special type of debt for which the processing can be delayed. However in at least one embodiment processing can be performed to generally ensure that all common or non-decref deltas or MD updates ingested before a particular decref are also processed before the particular decref. The foregoing in at least one embodiment means that the decref MDL depends on common MDL, but not the opposite. Due to the foregoing dependency in at least one embodiment, phase two destage processing of the decref MDL may only apply decref deltas for a particular MD page after the up-to-date version of that MD page is created (including application of deltas in HBSBs of common MDL, if such deltas for a given MD page exist in the common MDL HBSBs). In at least one embodiment, decrefs can be collected and can generally be applied in any order, such as applied in any order to a MD page, so long as any non-decref MD updates of the MD page ingested prior to a particular decref MD update to the particular MD page are applied prior to the particular decref MD update. Put another way, decrefs can be applied to the MD page in any order so long as ingest ordering application of non-decref MD updates with respect to a particular decref is followed.

Consistent with other discussion herein in at least one embodiment, decrefs are not idempotent. As such, different techniques or mechanisms can be utilized to avoid repeated application of the same non-idempotent delta such as decrefs. In at least one embodiment, a common MDL version or ID for a MD page persistently stored in the MD page store can be included in the header or footer of the persisted MD page, where the common MDL version or ID can denote the largest Tablet Id of all common MDL tablets already applied on this persisted MD page. In at least one embodiment, each common HBSB can be assigned a unique ID when the common HBSB is active. When the common HBSB is destaged and stored as a tablet, this unique ID can then become the tablet's tablet ID. In at least one embodiment, the common HBSB IDs and thus common MDL tablet IDs can monotonically increase with time such that increasing order of common MDL tablet IDs can denote increasing time order of MD updates of such tablets. The foregoing MDL version or ID for a persisted MD page of the MD page store can correspond to the largest tablet ID of all common MDL tablets applied to the persisted MD page. In at least one embodiment, common MDL tablet N can be destaged (such as in phase two destage) prior to common MDL tablet N+1, where N and N+1 are IDs of corresponding common HBSBs destaged as the corresponding common MDL tablets.

In at least one embodiment using a separate decref MDL and a separate decref tier, the decref MDL is yet another type of MDL (in addition to common MDLs) of applied updates to a MD page. In at least one embodiment, another version or ID (sometimes referred to as the decref version or ID) can be stored with a persisted MD page of the MD page store, where the decref version or ID can denote the largest tablet ID of all decref tablets already applied to the MD page. In such an embodiment, the decref HBSBs can also be assigned a unique ID that is a tablet ID in a manner similar to that as described above for common HBSBs from a monotonically increasing integer sequence. In at least one embodiment, decref tablet N can be destaged (such as in phase two destage) prior to decref MDL tablet N+1, where N and N+1 are IDs of corresponding common HBSBs destaged as the corresponding common MDL tablets.

In at least one embodiment in accordance with the techniques of the present disclosure, when the decref tier is OOS and there is a frozen decref HBSB to demote or destage (that cannot be destaged to the decref tier due to the OOS condition), the frozen decref HBSB can be processed and destaged directly to the MD page store bypassing the decref tier using the bypass destage technique.

In at least one embodiment of the bypass destage, a drop delta indicator can be used to guarantee MD consistency such as when there are two different processes concurrently destaging to the MD page store. In at least one embodiment, an associated tablet ID or version of a drop delta indicator can identify a particular decref tablet or decref HBSB that has been applied to a particular MD page to avoid repeatedly applying the same decrefs of the particular decref tablet or HBSB.

In at least one embodiment, the bypass destage processing does not update the decref tablet ID or version of a persisted MD page of the MD page store after applying decrefs as part of bypass destage processing in order to allow subsequent destaging of decref tablets of the decref tier after bypass destage has completed.

In at least one embodiment, the bypass destage method or technique, even if aborted or interrupted, can be completed in order to guarantee consistency of the two MD page versions denoted by 1) the decref tablet ID or version of a particular MD page as denoted by the drop delta indicator; and 2) the decref tablet ID or version of a particular MD page as persisted with the MD page in the MD page store. In at least one embodiment, even if the bypass destage processing of a frozen decref HBSB is aborted or interrupted, the bypass destage processing of the frozen decref HBSB can be allowed to complete. In at least one embodiment, the decref MDL can use the persistent decref tablet ID of the persisted MD page (as stored in the MD page store) as its corresponding page version. The decref tablet ID of the persisted MD page can be a unique identifier for each tablet such that the decref tablet ID of the active decref HBSB can be the largest decref tablet ID in the system. The second phase of destaging with respect to the decref tier can process decref tablets in FIFO (first in first out) order based on increasing decref tablet IDs. In this manner in at least one embodiment, bypass destage processing cannot update the persisted decref tablet ID of the persisted stored MD page of the MD page store. Otherwise, if the persisted decref tablet ID were updated as part of bypass destage processing, subsequently performing the second destage phase (of normal or regular two phase destage processing) or subsequently constructing an up to date MD page for read miss processing will erroneously skip applying decref deltas from decref tablets of the decref tier with corresponding decref tablet IDs that are less than the persisted decref tablet ID. In at least one embodiment, the bypass destage can use the drop delta indicator as a mechanism to avoid repeatedly applying the same decrefs to a MD page.

It should be noted that one alternative rather than use the techniques of the bypass destage of the present disclosure can include reading and applying the frozen decref HBSB and all relevant decrefs for a MD page from the decref tier so that the persisted decref tablet ID can be updated consistently with the decref tablet ID of the frozen decref HBSB. However, the foregoing alternative not using the techniques of the present disclosure can have several drawbacks. One drawback is that the decref tier can include a large number of decref tablets so reading and applying relevant decrefs of the decref tier for a particular MD page can significantly slow processing and may again cause data unavailability if the active decref HBSB gets full. A second drawback is that the decref tier may not be accessible and therefore processing may be unable to read and apply decrefs of the decref tier. Thus, since the bypass destage techniques of the present disclosure do not read and apply such decref tablets of the decref tier, the bypass destage techniques of the present disclosure may not update the persisted decref tablet ID of the persisted MD page of MD page store.

What will now be described is the bypass destage processing as can be performed with respect to a single MD page in connection with applying bypass destage processing to destage the inactive decref HBSB in at least one embodiment in accordance with the techniques of the present disclosure. The inactive decref HBSB can have an associated decref ID of X1 and the active decref HBSB can have an associated decref ID of X1+1. Generally, the bypass destage processing described herein for a single MD page can be performed for multiple MD pages.

In a first step S1, an up to date version of the MD page P1 can be created with all MD updates or deltas applied except the decrefs of the decref tier. The step S1 can include applying the decrefs for the MD page P1 from the active decref HBSB and the inactive decref HBSB. The step S1 can include applying non-decref or common MD updates for MD page P1 from the active common HBSB, the inactive common HBSB, and the common MDL tier. Following the step S1, a step S2 can be performed.

In the step S2, an atomic operation or transaction can be performed that includes: flushing or writing the updated version of the MD page P1 persistently to the MD page store; and persistently storing a first drop delta indicator to the RDL. The first drop delta indicator can be associated with the MD page P1 and can identify the inactive decref HBSB for which bypass destage processing is being performed. The drop delta indicator can identity the inactive decref HBSB by including its corresponding unique decref ID of X1. Following the step S2 is a step S3.

In the step S3, the first drop delta indicator can also be ingested and stored in the active decref HBSB. In at least one embodiment, the first drop delta indicator can be stored as an entry in the bucket B1 of the active decref HBSB, where B1 corresponds uniquely to the MD page P1. The entries of the buckets of the active HBSB can be maintained and sorted in time ingest order or order in which entries are inserted into the HBSB. Thus the first drop delta indicator denotes the MD page P1 and the decref tablet ID of the inactive decref HBSB for which bypass destage processing is now being performed. The first drop delta indicator can be characterized as a barrier denoting a separation of entries in the bucket B1 where those entries ingested prior to the first drop delta indicator are applied in the step S1 to the first MD page. Subsequently, additional decrefs for MD page P1 can be added as entries to bucket B1 where such additional entries comprise those ingested after the first drop delta indicator. Following the step S3 is a step S4.

In the step S4, at a later point in time, an operation or processing can be performed which includes creating an up to date version of the MD page P1. The up to date version of the MD page P1 can be created, for example, in connection with read miss processing and/or in connection with performing two phase destage processing or non-bypass destage processing. Generally, constructing the updated version of the MD page P1 subsequent to performing the steps S1, S2 and S3 noted above includes skipping or omitting all decrefs ingested prior to the first drop delta indicator as inserted in the active decref HBSB. In this example, the step S4 can omit or skip decrefs denoting MD updates to the MD page P1 as included in the inactive decref HBSB with tablet ID=X1. The step S4 can also omit or skip decrefs denoting MD updates to MD page P1 as included in the active decref HBSB with tablet ID=X1+1 where such decrefs skipped are ingested into the active decref HBSB prior to the first drop delta indicator. In at least one embodiment, constructing the updated version of the MD page P1 in the step S4 can include applying MD updates to the current version of the MD page P1 of the MD page store. In at least one embodiment, constructing the updated version of the MD page P1 in the step S4 can include: reading a current version of the MD page as stored persistently in the MD page store; applying relevant decrefs of the decref tier from decref tablets with decref tablet IDs greater than the persisted decref tablet ID; and applying relevant common MD updates of the common MDL tier from common tablets with common tablet IDs greater than the persisted common tablet ID; and applying relevant updates from the active and inactive common HBSBs. Additionally, relevant decrefs from the active decref HBSB and/or inactive decref HBSB can be applied or omitted consistent with the above discussion of any encountered drop delta indicator such as the first drop delta indicator noted above. For example, if the first drop delta indicator is encountered in the active decref HBSB, the decrefs applied include any decrefs of bucket B1 ingested or inserted into the active decref HBSB after the first drop delta indicator. The decrefs skipped, dropped or omitted in this case can include the decrefs of the inactive decref HBSB having the tablet ID=X1 (since X1 is included in the first drop delta indicator).

Consistent with other discussion herein, it is possible for the bypass destage processing of the inactive decref HBSB to be aborted or interrupted in response to any one or more trigger conditions. For example, the system may have failed, gone offline, or experienced a high availability (HA) event causing the system to reboot and perform recovery processing. Recovery processing can included restoring the system to a state using, at least in part, the information of the persistent RDL. Recovery processing can restore the in-memory structures of the MD logs and then restart bypass destage processing for the inactive decref HBSB. However, it may be that the recovery processing repeats performing bypass destage processing for a particular MD page such as P1. In order to ensure that idempotent decrefs are not repeatedly applied, a version of bypass destage processing described below can be performed as part of recovery processing. The processing described below for bypass destage processing of the inactive decref HBSB generally includes conditionally applying the decrefs to a particular MD page and is a variation or extension of processing described above.

In a first step S11, a up to date version of the MD page P1 can be created by applying only common MD updates and not applying any decrefs. The step S11 can include applying common or non-decref MD updates for P1 from the common MDL tier, the active common HBSB and the inactive common HBSB. Following the step S11, a step S12 can be performed to determine whether the active decref HBSB includes a relevant drop delta indicator. The step S12 can include determining whether the active decref HBSB includes the first drop delta indicator noted above which is included in the bucket B1 corresponding to P1 and where the first drop delta indicator also includes a tablet ID=X1 that corresponds to the inactive decref HBSB for which bypass destage processing is being performed. If the step S12 determines that there is such a drop delta indicator in the active decref HBSB that is associated with MD page P1 and which identifies the tablet ID=X1 of the inactive decref HBSN for which bypass destage processing is being performed, then no decrefs can be applied to MD page P1. In particular the decrefs skipped can include decrefs that update MD page P1 where such skipped decrefs are included in the inactive decref HBSB (with tablet ID=X) and the active decref HBSB (with tablet ID=X+1).

If the step S12 determines that there is no such relevant drop delta indicator in the active decref HBSB that is associated with MD page P1 and which identifies the tablet ID=X1 of the inactive decref HBSN for which bypass destage processing is being performed, then control can proceeds to the step S13.

In the step S13, decrefs from the inactive decref HBSB (e.g., with tablet ID=X1 and for which bypass destage is performed) can be applied to updated version of the MD page P1 generated as a result of the step S11. The step S13 can also include applying decrefs from the active decref HBSB. Consistent with other discussion herein, the decref tablet ID as stored persistently with the updated version of the MD page P1 is not updated by the bypass destage. Following the step S13, a step S14 can be performed.

In the step S14 (e.g., similar to the step S2), an atomic operation or transaction can be performed that includes: flushing or writing the updated version of the MD page P1 persistently to the MD page store; and persistently storing a first drop delta indicator to the RDL. The first drop delta indicator can be associated with the MD page P1 and can identify the inactive decref HBSB for which bypass destage processing is being performed. The drop delta indicator can identity the inactive decref HBSB by including its corresponding unique decref ID of X1. Following the step S14 is a step S15.

In the step S15 (e.g., similar to the step S3), the first drop delta indicator can also be ingested and stored in the active decref HBSB. In at least one embodiment, the first drop delta indicator can be stored as an entry in the bucket B1 of the active decref HBSB, where B1 corresponds uniquely to the MD page P1. The entries of the buckets of the active HBSB can be maintained and sorted in time ingest order or order in which entries are inserted into the HBSB. Thus the first drop delta indicator denotes the MD page P1 and the decref tablet ID of the inactive decref HBSB for which bypass destage processing is now being performed. The first drop delta indicator can be characterized as a barrier denoting a separation of entries in the bucket B1 where those entries ingested prior to the first drop delta indicator are applied in the step S1 to the first MD page. Subsequently, additional decrefs for MD page P1 can be added as entries to bucket B1 where such additional entries comprise those ingested after the first drop delta indicator.

In at least one embodiment, bypass destage processing can traverse the inactive decref HBSB bucket by bucket, and can process entries of each bucket.

In at least one embodiment, a batch of multiple MD pages can be processed as a single transaction. In at least one such embodiment, all MD pages in the batch can be processed using the bypass destage method step-by-step, where each step can be performed collectively for all MD pages in the batch. For example, the step S11 can be performed for all MD pages in the batch. Subsequently the step S12 can be performed for all MD pages of the batch to determine whether relevant drop delta indicators for such MD pages are included in the active decref HBSB. For those MD pages not having such relevant drop delta indicators, processing for those MD page can continue to the step S13 where S13 can be collectively performed for all qualifying MD pages. In this manner, subsequent processing can also continue for all MD pages in the batch.

In at least one embodiment, the drop delta indicator described herein with an associated MD page and corresponding tablet ID (e.g., decref tablet ID) can serve as an alternative decref ID or page version for the MD page. In such an embodiment having the persistently stored decref ID or decref tablet ID of the MD page in the MD page store as well as the drop delta indicator's tablet ID (denoting another decref tablet ID), additional rules can be utilized to guarantee MD page consistency. Changing the destage method with respect to a particular inactive decref HBSB from bypass mode to non-bypass mode (e.g., two phase destaging with demotion to decref tier) will deprecate the page versions denoted by the drop delta indicators meaning that some decrefs could be applied twice. Thus, once bypass destage processing has commenced for a particular inactive decref HBSB, the bypass destage processing of the inactive decref HBSB needs to complete. In this case in at least one embodiment, before actually starting the bypass destage process on the inactive decref HBSB, processing can be performed to persistently store a note or marker indicating that the particular inactive decref HBSB with a particular tablet ID is destaged using bypass destage. In case there is a high availability or other event causing the bypass destaging of the inactive decref HBSB to abort, the system can look to the persistently stored note or marked to ensure that the subsequent recovery processing restarts or resumes destaging the inactive decref HBSB using the same bypass destaging method. In at least one embodiment, the foregoing marker or note can be persistently stored in a superblock on non-volatile storage.

In at least one embodiment, it is possible for bypass destaging of the inactive decref HBSB to be performed when the active decref HBSB becomes full. In this case, bypass destaging of the inactive decref HBSB can be performed while concurrently the active decref HBSB becomes full, is frozen and demoted to the decref tier. During the bypass destaging of the inactive decref HBSB, the decref tier can become available and transition from the OOS state to another state with available capacity to store additional demoted frozen decref HBSBs. In at least one embodiment, the active decref HBSB can become frozen and demoted to the decref tier while bypass destage processing is ongoing for another inactive decref HBSB. However, although such demotion can be allowed, processing can be performed to ensure that memory of the active decref HBSB is not reclaimed until destage processing of the inactive decref HBSB has completed.

Consistent with discussion herein in at least one embodiment, MD page consistency in the bypass destage processing can be provided using the drop delta indicator. In at least one embodiment, the particular destaging method or technique (e.g., bypass destage or regular two phase destage) applied to destage a particular inactive decref HBSB may not be allowed to change. In this manner in such an embodiment, there is no conflict between the different types of decref MD page versions. In at least one embodiment, drop delta indicators can be guaranteed to be in-memory since reclamation of memory of an active decref HBSB may not be performed until bypass destage processing of the inactive decref HBSB has fully finished. Also, the active decref HBSB can be loaded into memory as part of recovery processing such as after an occurrence of a high availability event that causes bypass destage of the inactive decref HBSB to abort.

Figure 10:
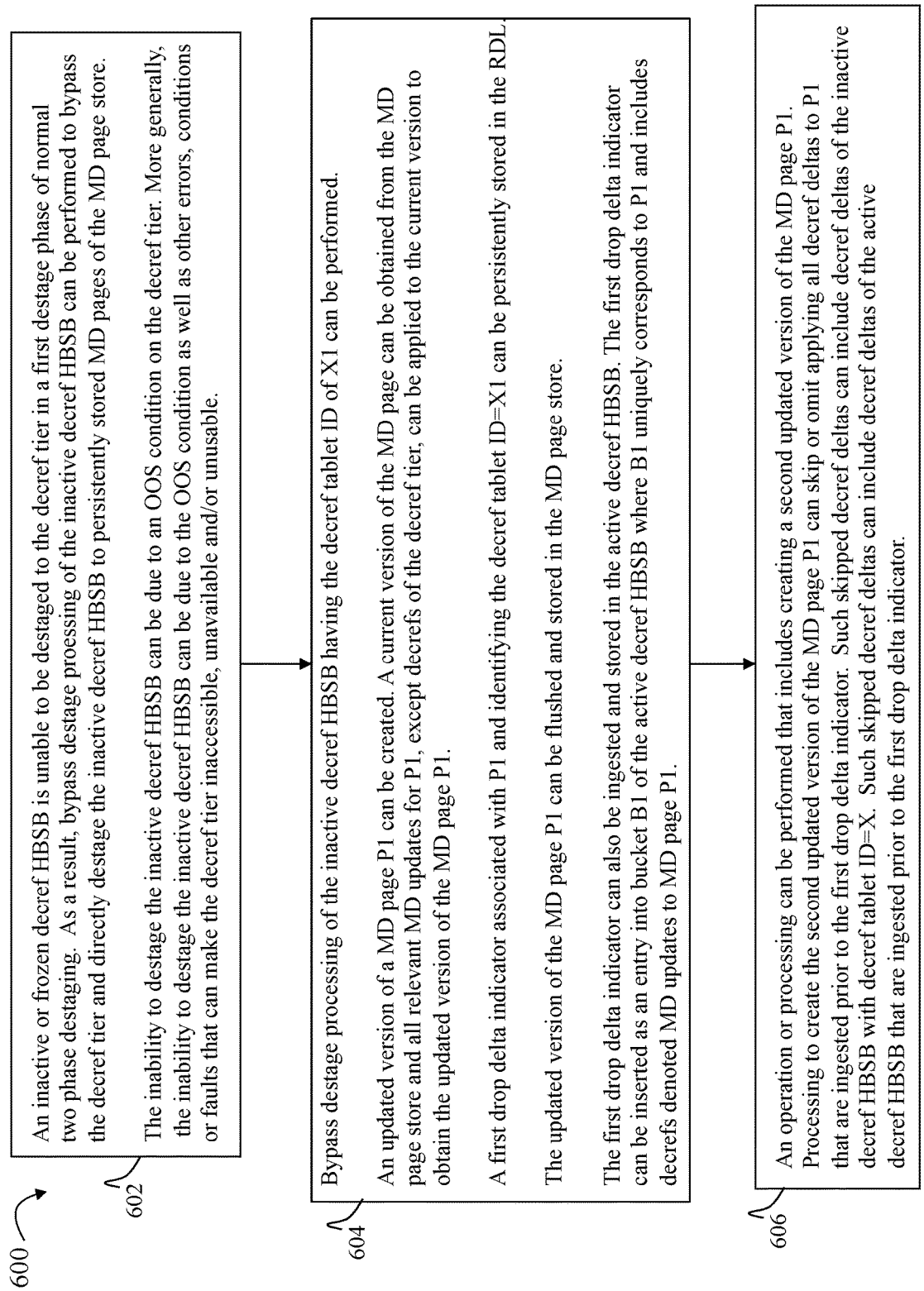
FIGS. 10 and 11 are flowcharts of processing steps which can be performed in at least one embodiment in accordance with the techniques of the present disclosure.
Figure 11:
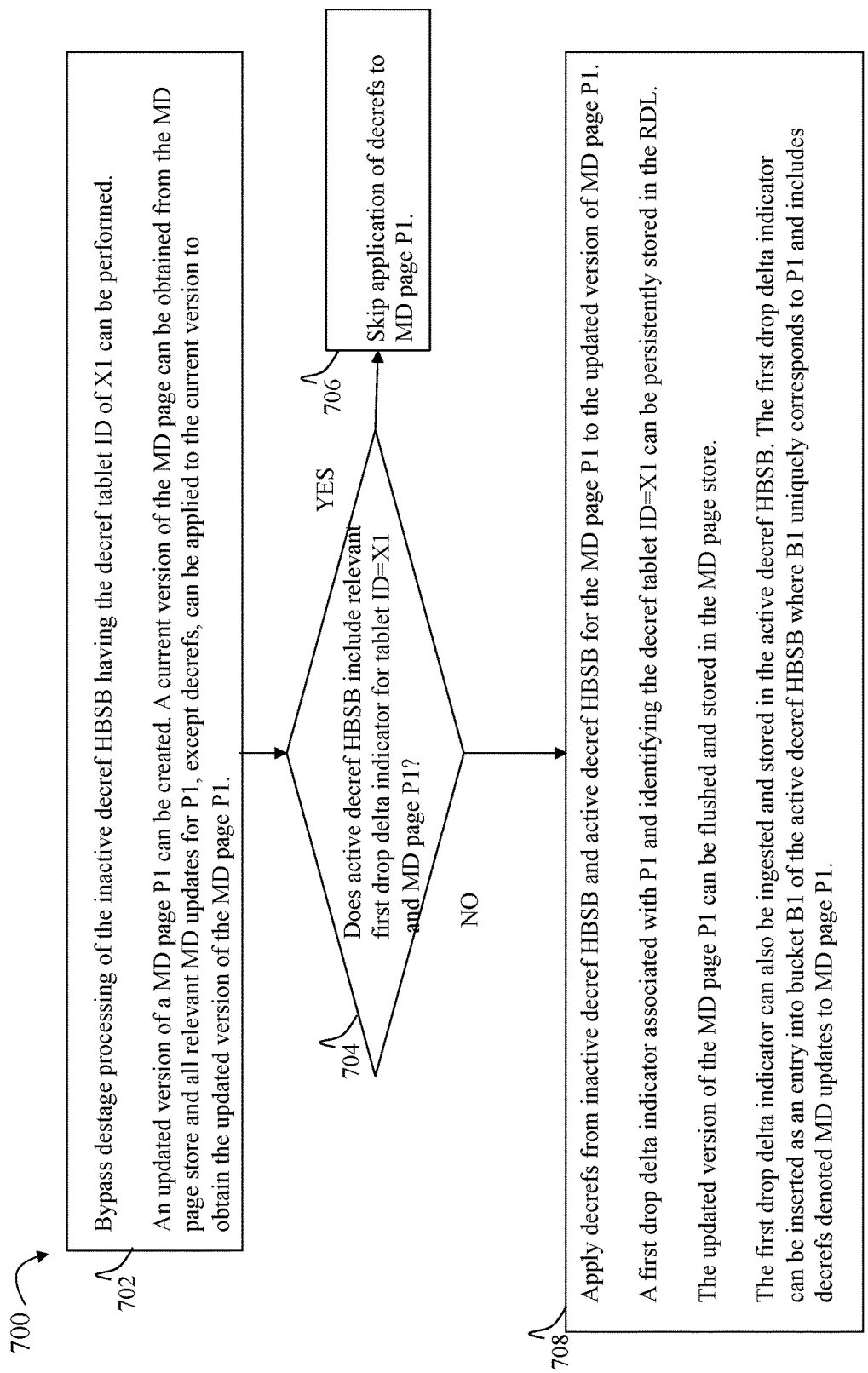

What will now be described in FIGS. 10 and 11 are flowcharts of processing steps that can be performed in at least one embodiment in accordance with the techniques of the present disclosure. The processing of FIGS. 10 and 11 summarize processing described above.

Referring to FIG. 10, shown is a first flowchart of processing steps that can be performed in at least one embodiment in accordance with the techniques of the present disclosure.

In a step 602, an inactive or frozen decref HBSB is unable to be destaged to the decref tier in a first destage phase of normal two phase destaging. As a result, bypass destage processing of the inactive decref HBSB can be performed to bypass the decref tier and directly destage the inactive decref HBSB to persistently stored MD pages of the MD page store.

In at least one embodiment, the inability to destage the inactive decref HBSB can be due to an OOS condition on the decref tier. More generally, the inability to destage the inactive decref HBSB can be due to the OOS condition as well as other errors, conditions or faults that can make the decref tier inaccessible, unavailable and/or unusable. From the step 602, control proceeds to the step 604.

At the step 604, bypass destage processing of the inactive decref HBSB having the decref tablet ID of X1 can be performed. As part of step 604, an updated version of a MD page P1 can be created. A current version of the MD page can be obtained from the MD page store and all relevant MD updates for P1, except decrefs of the decref tier, can be applied to the current version to obtain the updated version of the MD page P1.

In the step 604, once the updated version of MD page P1 is created, a first drop delta indicator associated with P1 and identifying the decref tablet ID=X1 can be persistently stored in the RDL, and the updated version of the MD page P1 can be flushed and stored in the MD page store.

In the step 604, the first drop delta indicator can also be ingested and stored in the active decref HBSB. The first drop delta indicator can be inserted as an entry into bucket B1 of the active decref HBSB where B1 uniquely corresponds to P1 and includes decrefs denoted MD updates to MD page P1.

Generally, the foregoing bypass destage processing described for a single MD page P1 can be performed for each desired MD page.

Following the step 604 is a step 606. In the step 606, an operation or processing can be performed that includes creating a second updated version of the MD page P1. For example, a read cache miss can occur with respect to the MD page P1 or two-phase (e.g., non-bypass) destage processing can be performed with respect to the MD page P1. In the step 606, processing to create the second updated version of the MD page P1 can skip or omit applying all decref deltas to P1 that are ingested prior to the first drop delta indicator. Such skipped decref deltas can include decref deltas of the inactive decref HBSB with decref tablet ID=X. Such skipped decref deltas can include decref deltas of the active decref HBSB that are ingested prior to the first drop delta indicator.

Referring to FIG. 11, shown is a second flowchart of processing steps that can be performed in at least one embodiment in accordance with the techniques of the present disclosure.

At the step 702, bypass destage processing of the inactive decref HBSB having the decref tablet ID of X1 can be performed. For a particular MD page P1, an updated version of the MD page P1 can be created. A current version of the MD page can be obtained from the MD page store and all relevant MD updates for P1, except decrefs, can be applied to the current version to obtain the updated version of the MD page P1. From the step 702, control proceeds to the step 704.

At the step 704, a determination can be made as to whether the active decref HBSB include a relevant first drop delta indicator for tablet ID=X1 and MD page P1. If the step 704 evaluates to yes, control proceeds to the step 706 to skip application of decrefs to MD page P1. If the step 704 evaluates to no, control proceeds to the step 708.

At the step 708, processing can be performed to apply decrefs from the inactive decref HBSB and the active decref HBSB for the MD page P1 to the updated version of MD page P1 (as generated by the step 702). In the step 708, once the decrefs are applied, a first drop delta indicator associated with MD page P1 and identifying the decref tablet ID=X1 can be persistently stored in the RDL, and the updated version of the MD page P1 can be flushed and stored in the MD page store. Also in the step 708, the first drop delta indicator can also be ingested and stored in the active decref HBSB. The first drop delta indicator can be inserted as an entry into bucket B1 of the active decref HBSB where B1 uniquely corresponds to P1 and includes decrefs denoted MD updates to MD page P1.

Generally, the foregoing bypass destage processing described for a single MD page P1 can be performed for each desired MD page.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   determining that an inactive decref (decrement reference count) MDL (metadata log) of decref MD (metadata) updates stored in memory is unable to be destaged to a decref tier of non-volatile storage in a first destage phase of a two phase destage process; and
   responsive to determining that the inactive decref MDL is unable to be destaged to the decref tier, performing bypass destage processing of the inactive decref MDL, wherein said bypass destage processing includes directly applying MD updates of the inactive decref MDL to corresponding MD pages stored persistently in a MD page store and wherein said bypass destage processing omits storing the inactive decref MDL on the decref tier.

2. The computer-implemented method of claim 1, wherein said bypass destage processing comprises:
   creating an updated version of a first MD page, wherein said creating includes applying first decref MD updates to the first MD page, wherein said first decref MD updates are updates to the first MD page and are included in the inactive decref MDL being destaged by the bypass destage processing;
   persistently storing the updated first MD page in a MD page store; and
   subsequent to creating the updated version of the first MD page, inserting a first drop delta indicator in an active decref MDL of decref MD updates stored in memory, wherein the first drop delta indicator is inserted in a bucket B1 of the active decref MDL, wherein the bucket B1 uniquely corresponds to the first MD page, wherein the first drop delta indicator includes a first tablet ID (identifier) uniquely identifying the inactive decref MDL being destaged by the bypass destage processing.

3. The computer-implemented method of claim 2, wherein said creating the updated version of the first MD page includes:
  applying second decref MD updates to the first MD page, wherein the second decref MD updates are included in the active decref MDL and are ingested prior to the first drop delta indicator;
  applying first common MD updates to the first MD page, wherein the first common MD updates are non-decref MD updates to the first MD page which are included in an active common MDL of non-decref MD updates stored in memory;
  applying second common MD updates to the first MD page, wherein the second common MD updates are non-decref MD updates to the first MD page which are included in an inactive common MDL of non-decref MD updates stored in memory; and
  applying third common MD updates to the first MD page, wherein the third common MD updates are non-decref MD updates to the first MD pages which are stored in a common MDL tier of non-volatile storage.

4. The computer-implemented method of claim 3, further comprising:
  destaging the inactive common MDL using the two phase destage process including:
    storing the inactive common MDL as a corresponding tablet on the common MDL tier of non-volatile storage;
    aggregating MD updates from the corresponding tablet and one or more other tablets; and
    applying the aggregated MD updates to one or more MD pages of the MD page store.

5. The computer-implemented method of claim 3, wherein said creating the updated version of the first MD page includes applying all MD updates to the first MD page except MD updates stored on the decref tier.

6. The computer-implemented method of claim 3, further comprising:
  creating a revised version of the first MD page, wherein said creating includes:
    reading a current version of the first MD page from the MD page store; and
    applying MD updates to the first MD page, wherein said applying includes omitting application of decref MD updates to the first MD page which are ingested prior to the first drop delta indicator.

7. The computer-implemented method of claim 3, wherein said bypass destage processing of the inactive decref MDL is aborted at a first point in time, and at a subsequent second point in time, recovery processing is performed that includes resuming bypass destage processing of the inactive decref MDL, wherein said recovery processing includes:
  creating a second updated version of the first MD page without applying any decref MD updates to the first MD page;
  determining whether the active decref MDL includes the first drop delta indicator with the first tablet ID uniquely identifying the inactive decref MDL being destaged by the bypass destage processing; and
  responsive to determining the active decref MDL does include the first drop delta indicator with the first tablet ID uniquely identifying the inactive decref MDL being destaged by the bypass destage processing, omitting application of all decref MD updates to the second updated version of the first MD page.

8. The computer-implemented method of claim 7, wherein said recovery processing includes:
  responsive to determining the active decref MDL does not include the first drop delta indicator with the first tablet ID uniquely identifying the inactive decref MDL being destaged by the bypass destage processing, performing first processing comprising:
    applying second decref MD updates to the second updated version of the first MD page, wherein said second decref MD updates are updates to the first MD page and are included in the inactive decref MDL being destaged by the bypass destage processing;
    applying third decref MD updates to the second updated version of the first MD page, wherein said third decref MD updates are updates to the first MD page and are included in the active decref MDL;
    after application of the second decref MD updates and the third decref MD updates to the second updated version of the first MD page, persistently storing the second updated version of the first MD page in the MD page store; and
    inserting the first drop delta indicator in the active decref MDL of decref MD updates stored in memory, wherein the first drop delta indicator is inserted in the bucket B1 of the active decref MDL, wherein the bucket B1 uniquely corresponds to the first MD page, wherein the first drop delta indicator includes the first tablet ID (identifier) uniquely identifying the inactive decref MDL being destaged by the bypass destage processing.

9. The computer-implemented method of claim 2, further comprising:
  freezing the active decref MDL thereby converting the active decref MDL to a second inactive decref MDL; and
  destaging the second inactive decref MDL using the two phase destage process, wherein said destaging the second inactive decref MDL includes:
    storing, in the decref tier, a second tablet corresponding to the second inactive decref MDL; and
    creating a revised version of the first MD page, wherein said creating includes omitting application of decref MD updates to the first MD page which are ingested prior to the first drop delta indicator.

10. The computer-implemented method of claim 9, wherein the omitted decref MD updates, which are not applied to the first MD page in said creating the revised version of the first MD page, include one or more decref MD updates which are included in the bucket B1 of the second tablet and which are ingested prior to the first drop delta indicator.

11. The computer-implemented method of claim 9, wherein the omitted decref MD updates, which are not applied to the first MD page in said creating the revised version of the first MD page, include all decref MD updates of the bucket B1 of the inactive decref MDL identified by the first tablet ID of the first drop delta indicator.

12. The computer-implemented method of claim 1, wherein each decref MD update of the inactive decref MDL decrements by one (1) a reference counter of an entry of a MD page.

13. The computer-implemented method of claim 12, wherein the reference count is associated with first content stored on non-volatile storage and wherein the reference count denotes a number of times the first content is referenced by one or more storage objects thereby indicating that the first content is included as stored content of the one or more storage objects.

14. The computer-implemented method of claim 1, further comprising:

receiving and servicing a write operation that writes second content to a first logical address LA1, wherein prior to the write operation, first content is stored at LA1, and after servicing the write operation, the second content is stored at LA1 whereby the write operation overwrites the first content of LA1 with the second content.

15. The computer-implemented of claim 14, wherein the inactive decref MDL includes a first decref MD update that decrements by one (1) a first reference count of a first entry of a first MD page, wherein the first reference count denotes a number of times the first content is referenced by one or more logical addresses of one or more corresponding storage objects thereby indicating that the first content is stored at the one or more logical addresses of the one or more corresponding storage objects, and wherein the first decref MD update of the inactive decref MDL is recorded in connection with servicing the write operation.

16. The computer-implemented method of claim 1, wherein said determining that the inactive decref MDL stored in memory is unable to be destaged to the decref tier includes determining that that the decref tier of non-volatile storage has an insufficient amount of storage capacity for storing the inactive decref MDL.

17. The computer-implemented method of claim 1, wherein said determining that the inactive decref MDL stored in memory is unable to be destaged to the decref tier includes determining that that the decref tier of non-volatile storage is inaccessible and/or in a state of failure.

18. A system comprising:
one or more processors; and
one or more memories comprising code stored thereon that, when executed, performs a method of comprising:
determining that an inactive decref (decrement reference count) MDL (metadata log) of decref MD (metadata) updates stored in memory is unable to be destaged to a decref tier of non-volatile storage in a first destage phase of a two phase destage process; and
responsive to determining that the inactive decref MDL is unable to be destaged to the decref tier, performing bypass destage processing of the inactive decref MDL, wherein said bypass destage processing includes directly applying MD updates of the inactive decref MDL to corresponding MD pages stored persistently in a MD page store and wherein said bypass destage processing omits storing the inactive decref MDL on the decref tier.

19. A non-transitory computer readable medium comprising code stored thereon that, when executed, performs a method comprising:
determining that an inactive decref (decrement reference count) MDL (metadata log) of decref MD (metadata) updates stored in memory is unable to be destaged to a decref tier of non-volatile storage in a first destage phase of a two phase destage process; and
responsive to determining that the inactive decref MDL is unable to be destaged to the decref tier, performing bypass destage processing of the inactive decref MDL, wherein said bypass destage processing includes directly applying MD updates of the inactive decref MDL to corresponding MD pages stored persistently in a MD page store and wherein said bypass destage processing omits storing the inactive decref MDL on the decref tier.

* * * * *